US006527026B1

(12) United States Patent
Huggins

(10) Patent No.: US 6,527,026 B1
(45) Date of Patent: Mar. 4, 2003

(54) PRINTER

(75) Inventor: Orville C. Huggins, Centerville, OH (US)

(73) Assignee: Monarch Marking Systems, Inc., Dayton, OH (US)

( * ) Notice: Subject to any disclaimer, the term of this patent is extended or adjusted under 35 U.S.C. 154(b) by 278 days.

(21) Appl. No.: 09/159,972

(22) Filed: Sep. 24, 1998

(51) Int. Cl.[7] ................................................ B32B 35/00
(52) U.S. Cl. ........................................ 156/387; 156/584
(58) Field of Search ................................. 156/384, 387, 156/584

(56) References Cited

U.S. PATENT DOCUMENTS 4,120,245 A * 10/1978 Karp et al. ............. 156/384 X
4,330,097 A * 5/1982 George et al. .......... 156/384 X
4,676,859 A * 6/1987 Cleary, Jr. et al. ....... 156/384 X
4,957,379 A 9/1990 Hamisch, Jr. et al.
5,168,814 A * 12/1992 Kuzuya et al. .......... 156/387 X
5,232,540 A * 8/1993 Southwell et al. ....... 156/384 X
5,486,259 A 1/1996 Goodwin et al.
5,788,384 A 8/1998 Goodwin et al.

* cited by examiner

*Primary Examiner*—Mark A. Osele
(74) *Attorney, Agent, or Firm*—Joseph J. Grass

(57) ABSTRACT

There is disclosed a printer for printing and dispensing labels releasably adhered to a carrier web. The printer includes a print head and a cooperable platen roll, a delaminator for delaminating printed labels from the web, a take-up roll for drawing the web about the delaminator, and a slip clutch for limiting the amount of driving force applied to the web by the take-up roll. Slippage occurs at the slip clutch but not between the take-up roll and the web.

6 Claims, 22 Drawing Sheets

PRINTER

BACKGROUND OF THE INVENTION

1. Field of the Invention

This invention relates to the art of printers and labelers.

2. Brief Description of the Prior Art

The following U.S. patents are made of record: U.S. Pat. Nos. 4,957,379; 5,486,259; and 5,788,384.

SUMMARY OF THE INVENTION

The invention relates to an improved drive mechanism for a take-up roll of a printer.

According to the specific embodiment of the invention, a printer having a print head and a cooperating platen roll, and a delaminator, further has a take-up roll which is attempted to be driven at a higher peripheral than the peripheral speed of the peripheral speed of the platen roll. The printer can print on labels releasably adhered to a carrier web. The take-up roll drivingly contacts the web. Label delamination takes place at the delaminator when the take-up roll rotates. The take-up roll is driven through a slip clutch which limits the pulling force applied to the web by the take-up roll. Thus, no slippage occurs between the web and the take-up roll. It is preferred that the platen roll and the take-up roll are driven by only one electric motor. Gearing connects the motor to the platen roll and to the slip clutch.

DETAILED DESCRIPTION OF THE PREFERRED EMBODIMENT

Figure 1:
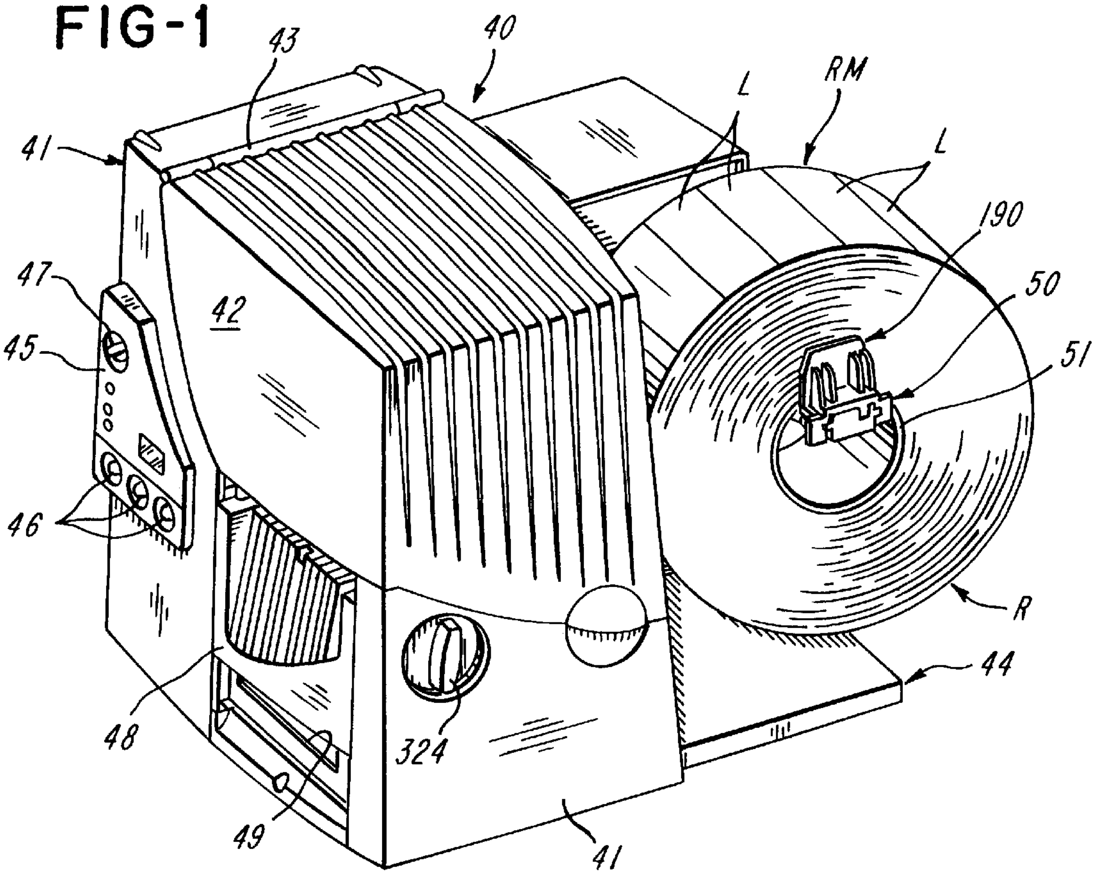
FIG. 1 is a perspective view of a printer in accordance with the invention.

With reference to FIG. 1, there is shown a printer generally indicated at 40 having a housing 41 with cover 42 pivotally mounted at a hinge 43. The printer 40 also includes a frame 44. A roll R of a web of record members RM is mounted on the frame 44.

The housing 41 has a control panel 45 having various control buttons 46 and a latch control knob 47. The housing 41 has a movable panel 48 with an exit opening 49. The panel 48 is pivotally mounted from its closed latched position shown in FIG. 1 to its open position shown in FIG. 3.

Figure 2:
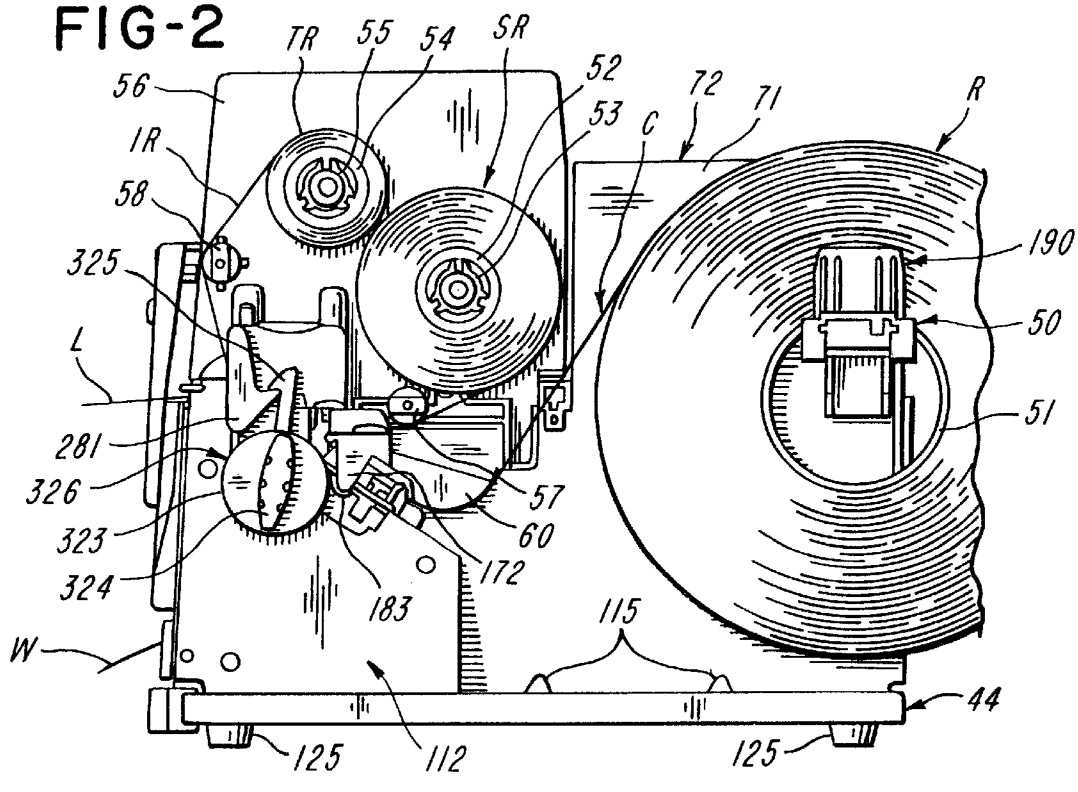
FIG. 2 is a side elevational view of the printer with its housing removed.
Figure 4:
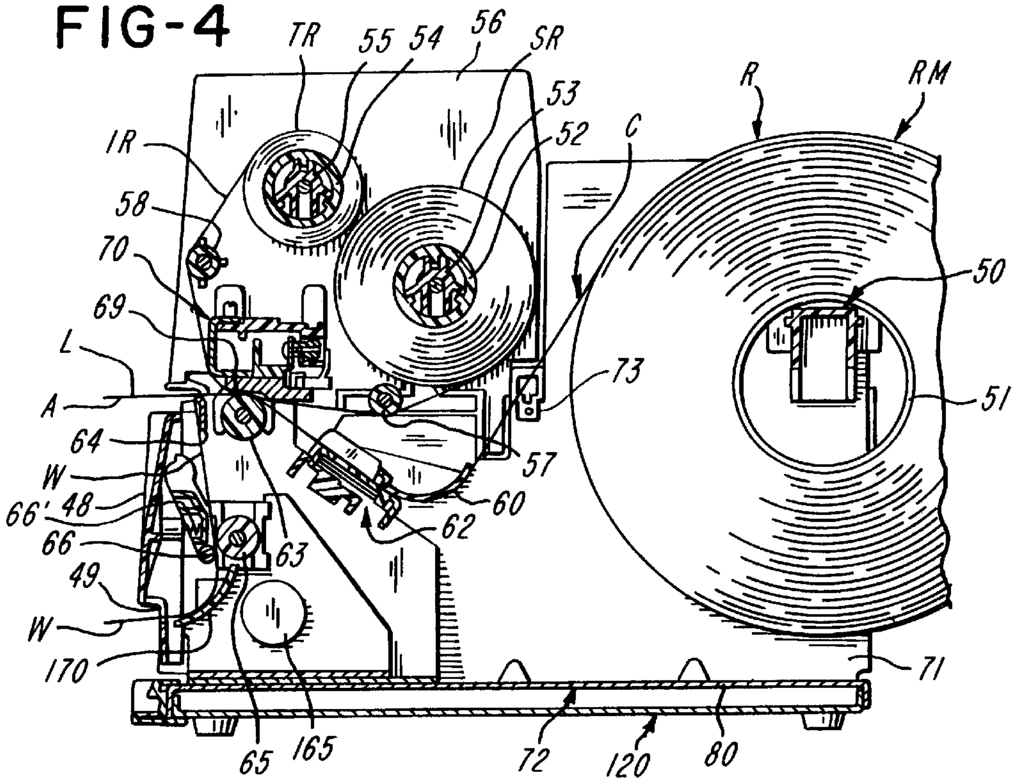
FIG. 4 is a side elevational view similar to FIG. 2 but showing various components in section.

FIGS. 1 and 4 show that the web of record members RM comprises a composite web C which includes a carrier web W and labels L releasably adhered to the carrier web W by pressure sensitive adhesive A. The roll R is mounted on a roll mounting member generally indicated at 50 which fits through core 51 of the roll R;

FIG. 2 shows a supply roll or spool SR of thermal ink ribbon IR and a take-up roll or spool TR of the ink ribbon IR. The supply roll or spool SR is wound onto a core 52 which is releasably mounted on a spindle 53. The take-up roll TR is wound onto a core 54 releasably mounted on a spindle 55. The cores 52 and 54 are identical, and the spindles 53 and 55 are identical.

Figure 3:
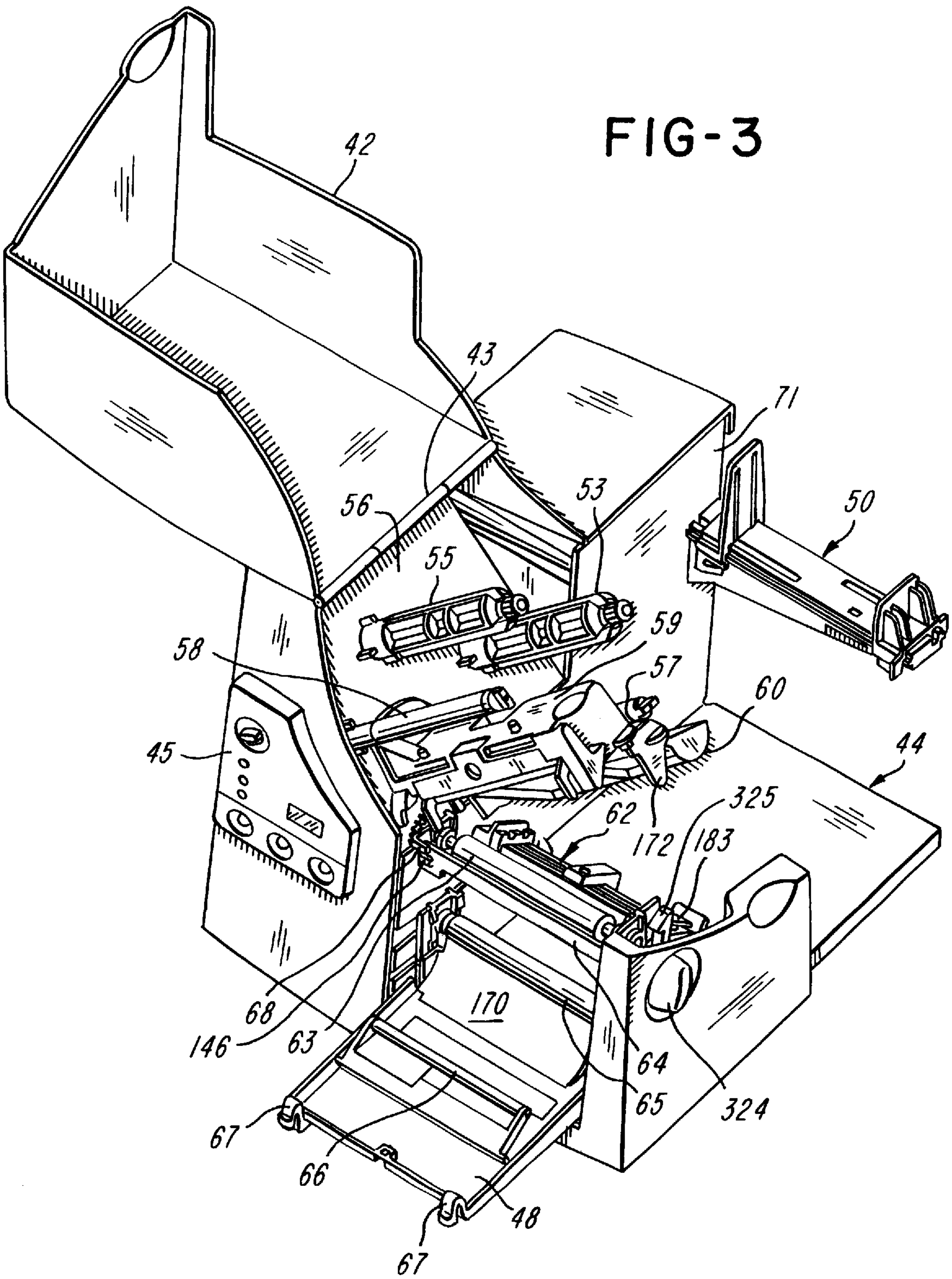
FIG. 3 is a perspective view of the printer with its cover opened, with the mounting member and its associated print head assembly, drive and take-up spindles and guides pivoted to an open position, and a front panel pivoted to its open position.

FIG. 3 shows that a movable mounting member 56 for cantilever mounting the spindles 53 and 55, parallel ink ribbon guides 57 and 58, a support or bracket 59, a composite web guide 60, a roll mounting assembly 50, and a composite web guide assembly 62. FIG. 3 also shows a platen roll 63, a delaminator 64 which can be in the form of a bar as shown or a small diameter roller also known as a peel roller, and a drive or take-up roll 65 and a cooperation spring-urged two-part idler roll 66. Spring 66' acts on the panel 48 to urge the panel 48 counterclockwise (FIG. 4). The panel 48 is shown to have a pair of integrally-formed latch members 67 cooperable with tangs 68 to releasably latch the panel 48 in its closed position shown in FIG. 1.

FIG. 4 shows the path of the web of record members RM from the supply roll R, to beneath the guide 60, through the guide assembly 62, and between thermal print head 69 of a print head assembly 70 and the platen roll 63. From there the carrier web W passes partially around a peel bar 64 at which a label L is delaminated from the carrier web W. From there the carrier web W passes between the nip of rolls 65 and 66. The roll 65 is powered so that the portion of the web W between the peel bar 64 and the nip of rolls 65 and 66 is under tension. As the carrier web W exits from the nip of rolls 65 and 66, the carrier web exits through the opening 49 at which the carrier web W can be torn off.

Figure 5:
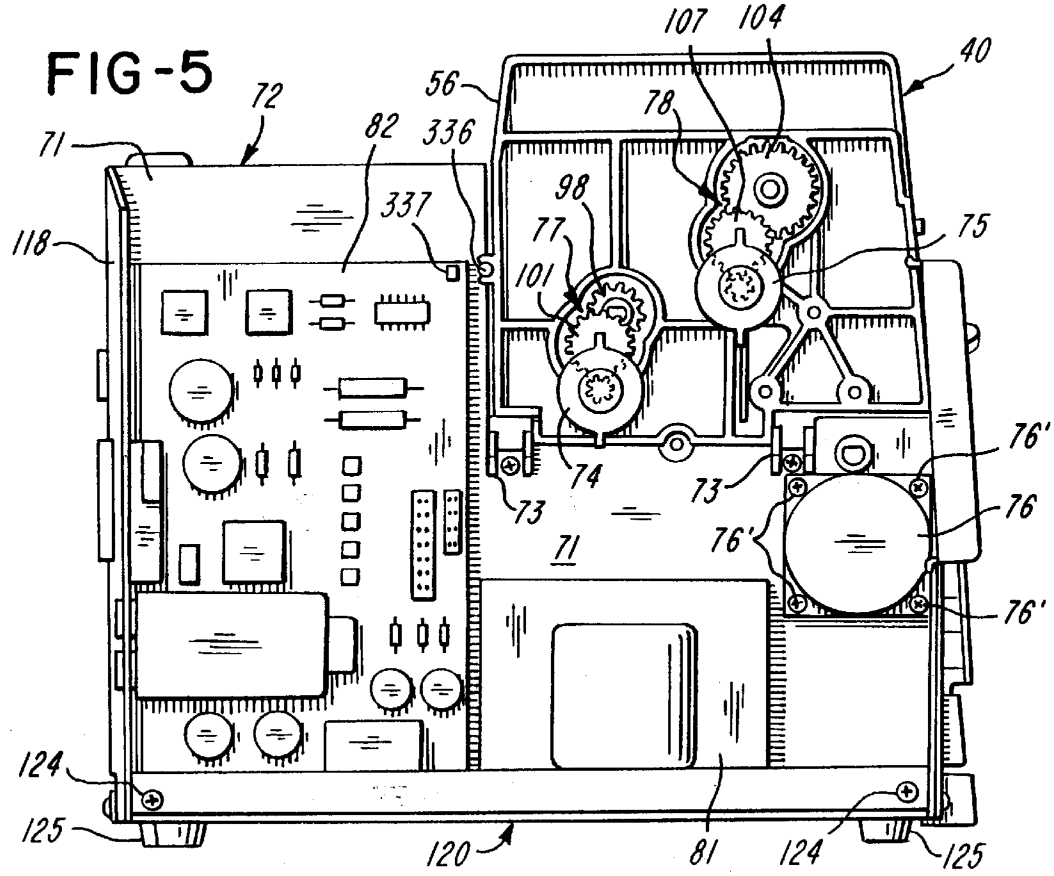
FIG. 5 is a side elevational view showing the side of the printer opposite from the side shown in FIGS. 2 and 4 for example.
Figure 6:
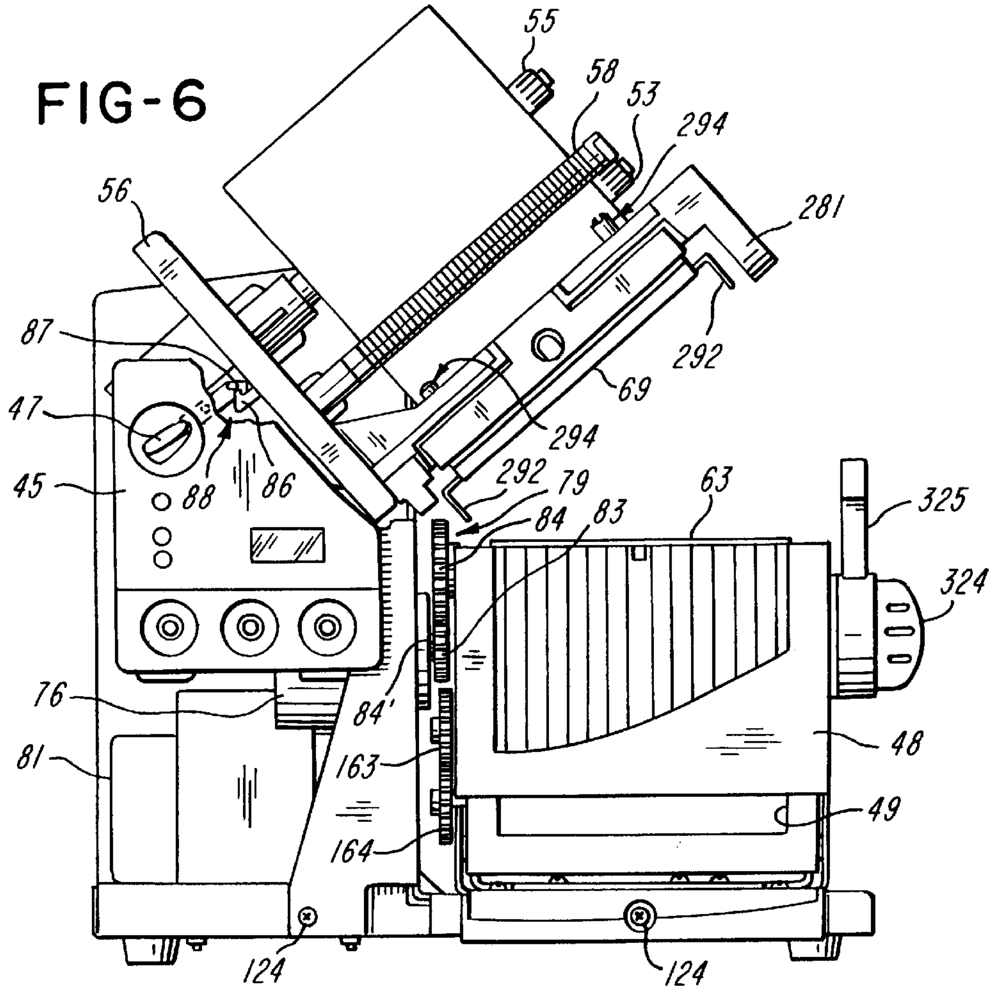
FIG. 6 is a front elevational view showing the printer with its cover removed and with components in the open position.

With reference to FIG. 5, the mounting member 56 is shown to be movably mounted on a generally vertical frame panel 71 of a main frame member 72 by means of a pair of identical, spaced, aligned hinge blocks 73. The mounting member 56 mounts an electric ink ribbon supply motor 74 and an electric ink ribbon take-up motor 75. An electric platen drive motor 76 is mounted on the vertical frame panel 71 by four screws 76'. The motor 74 powers the spindle 53 through gearing 77, the motor 75 powers the spindle 55 through gearing 78, and the motor 76 powers the platen roll 63 through gearing 79 (FIG. 6). A transformer 81 is mounted on a base plate 120. The frame panel 71 mounts a print circuit board 82. An access slot 82' (FIG. 10) is located adjacent the printed circuit board 82.

FIG. 6 shows the mounting member 56 and associated structure in the fully open position to facilitate loading of the web of record members RM and the ink ribbon IR. The gearing 79 includes a gear 83 on the output shaft 84' of the motor 76 in mesh with a gear 84 on shaft 85 (FIG. 12) of the platen roll 63. FIG. 6 also shows a hook 86 on the mounting member 56 engaged with a latch tooth 87 of a latch 88 of which the knob 47 forms a part. The latch 88 holds the mounting member 56 and associated structure in the position shown in FIG. 6 until the knob 47 is rotated counterclockwise.

Figure 8:
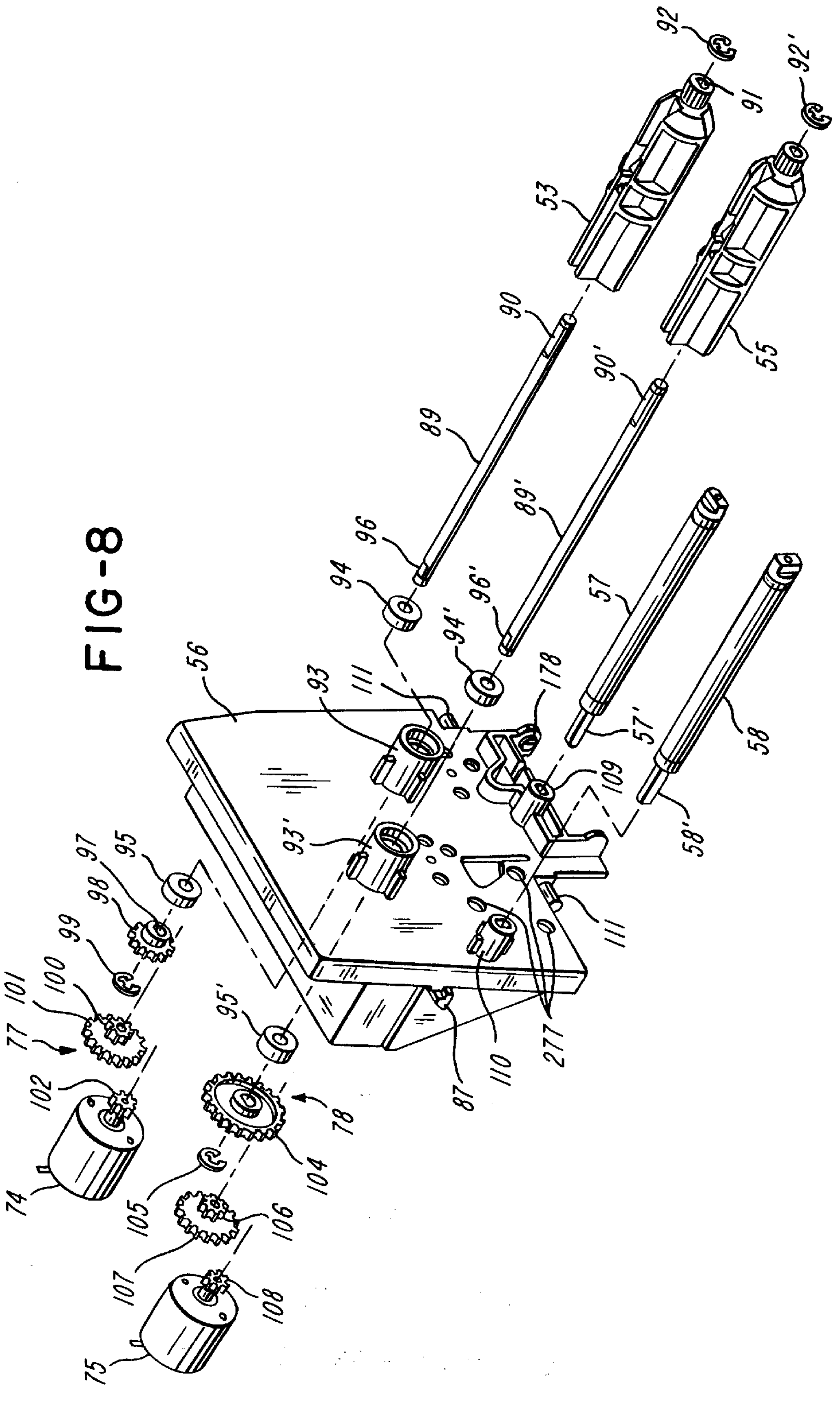
FIG. 8 is an exploded perspective view showing the mounting member, drive and take-up spindles, guides and the spindle powering means.

FIG. 8 shows the spindle 53 mounted on a drive shaft 89 having a D-shaped portion 90. The D-shaped portion 90 fits into a D-shaped hole 91. The spindle 53 is held in place on the shaft 89 by an E-ring 92. A tubular boss 93 formed integrally with mounting member 56 mounts bearings 94 and 95 which in turn rotatably mount the shaft 89. The shaft 89 has another D-shaped portion 96 received in a D-shaped hole 97 in a gear 98. Thus, the gear 98, the shaft 89 and the spindle 53 rotate as a unit. An E-ring 99 holds the gear 98 on the shaft 89. The gear 98 meshes with a gear 100 integrally molded with a larger gear 101. The gear 101 meshes with a gear 102 on the output shaft of the motor 74. Likewise, the spindle 55 is mounted on a shaft 89' having D-shaped portions 90' and 96'. An E-ring 92' holds the spindle 55 in position on the shaft 89'. Bearings 94' and 95' mounted in boss 93' rotatably mount the shaft 89'. A gear 104 on D-shaped portion 96' meshes with a gear 106 integrally molded with a gear 107. The gear 107 meshes with a gear 108 on the output shaft of the motor 75. An E-ring 105 holds the gear 104 on the shaft 89'. The gear 104, the shaft 89' and the spindle 55 rotate as a unit. The gearing 77 comprises the gears 98, 100, 101 and 102, and the gearing 78 comprises the gears 104, 106, 107 and 108.

As shown in FIG. 8, the guides 57 and 58 are shown in greater detail in FIGS. 1 and 9 through 16 of co-owned U.S. Pat. No. 5,160,205 to Mistyurik. The guides 57 and 58 include respective shafts 57' and 58'. The guides 57 and 58 are secured in tubular bosses 109 and 110 molded integrally with the mounting member 56. Hinge pins 111 integrally molded with the mounting member 56 are received in mounting blocks 73.

Figure 10:
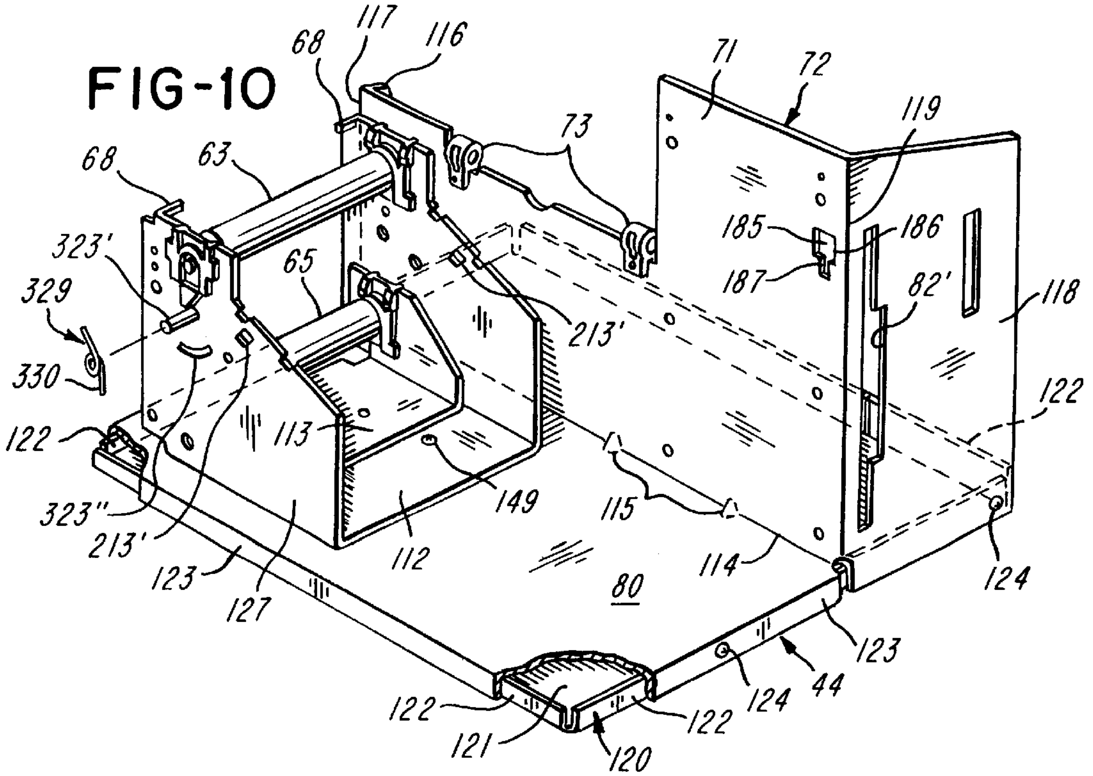
FIG. 10 is a perspective view of the frame and two subframes mounted on the frame.

FIG. 10 shows the relationship of the main frame member 72, a subframe 112 for mounting the platen roll 63 and the peel bar 64, and a subframe 113 for mounting the drive roll 65.

Figure 11:
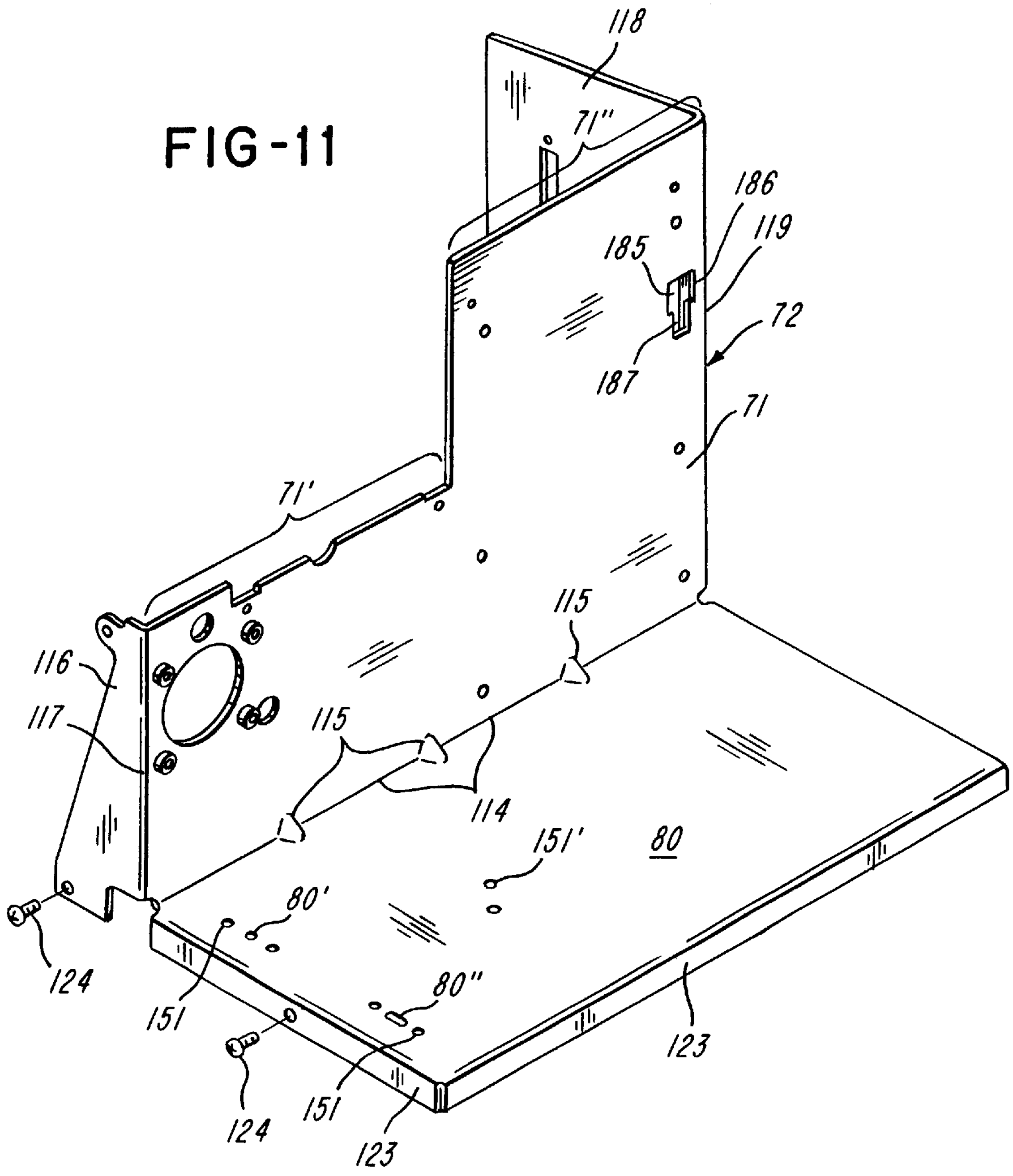
FIG. 11 is a perspective view of a main frame of the printer.

FIG. 10 and FIG. 11 show the main frame member 72 in detail. The main frame member 72 includes the generally vertical frame panel 71 and the generally horizontal frame panel 80 connected at a bend 114. Three gussets 115 are formed integrally by embossing at the bend 114 to strengthen the right-angle connection between the frame panels 71 and 80. A generally vertical frame panel 116 is joined to one end of the frame panel 71 at a bend 117. Another generally vertical frame panel 118 is joined to the other end of the frame panel 71 at a bend 119. The frame panel 116 makes a right angle with the frame panel 71. The frame panel 118 makes slightly less than a right angle with the frame panel 71.

As best shown in FIG. 10, the frame 44 also includes the base plate 120 having a horizontal base panel 121 and four upstanding flanges 122. The frame panel 80 has three depending flanges 123 secured to the flanges 122 by screws 124. The frame panels 116 and 118 are secured to the flanges 122 by screws 124. When thus assembled the frame 72 presents a rigid relatively light-weight construction onto which components can be readily assembled. The base plate 120 has four resilient feet 125 secured thereto. It is seen that the frame panel 71 is generally L-shaped and has a portion 71' of a predetermined height and a portion 71" of a height greater than the height of the portion 71'.

Figure 12:
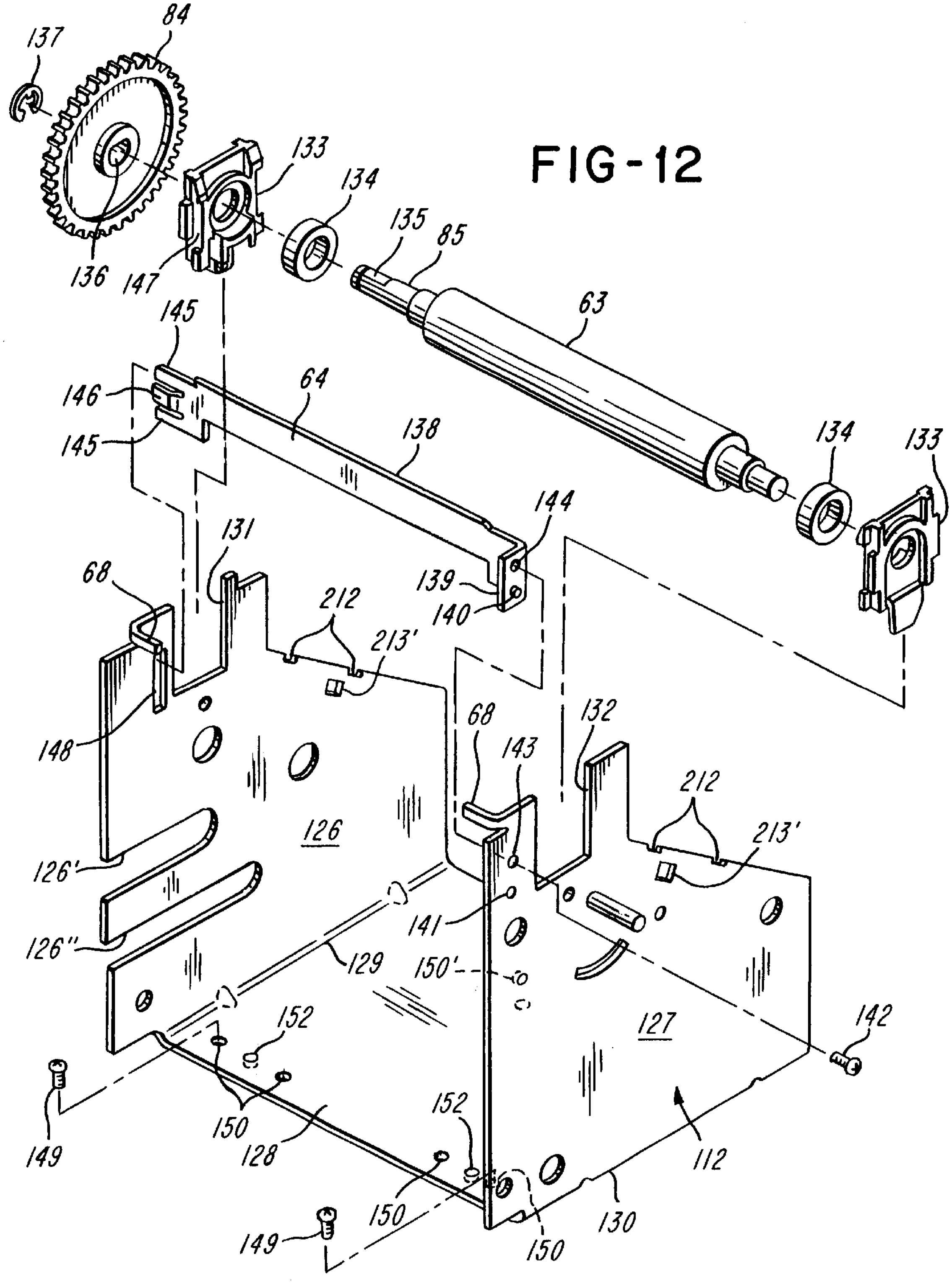
FIG. 12 is an exploded perspective view of the platen roll assembly or module including its subframe.

FIG. 12 shows the subframe 112 as being generally U-shaped in construction with upstanding parallel walls 126 and 127 joined to a bight portion 128 at bends 129 and 130. The walls 126 and 127 have respective cutouts 131 and 132 for receiving identical bearing blocks 133. The platen roll shaft 85 mounts in bearings 134 which are in turn mounted in the bearing blocks 133. The shaft 85 has a D-shaped end portion 135. The end portion 135 is received in a D-shaped hole 136 in the gear 84. The gear 84 is held in place by an E-ring 137. The peel bar 64 has a rolled edge 138 and is secured to the walls 126 and 127. The peel bar 64 has a flange 139 with a stud 140 received through a hole 141. A screw 142 passing through a hole 143 is threadably received in a hole 144 in the flange 139. The other end portion of the peel bar 64 has a pair of aligned fingers 145 and an offset finger 146. The fingers 145 and the flanges 146 extend into a recess 148.

The bight portion 128 is secured to the frame panel 80 by means of two screws 149 passing through two holes 150 and threaded into holes 151 in the frame panel 80. There are embossed depressions or dimples 152 in the bight portion 128 which register with a hole 80' and a slot 80" in the frame panel 80. Also, a screw 149 passes through a hole 150' in the bight portion 128 and is threaded into base panel 80 at 151'.

Figure 13:
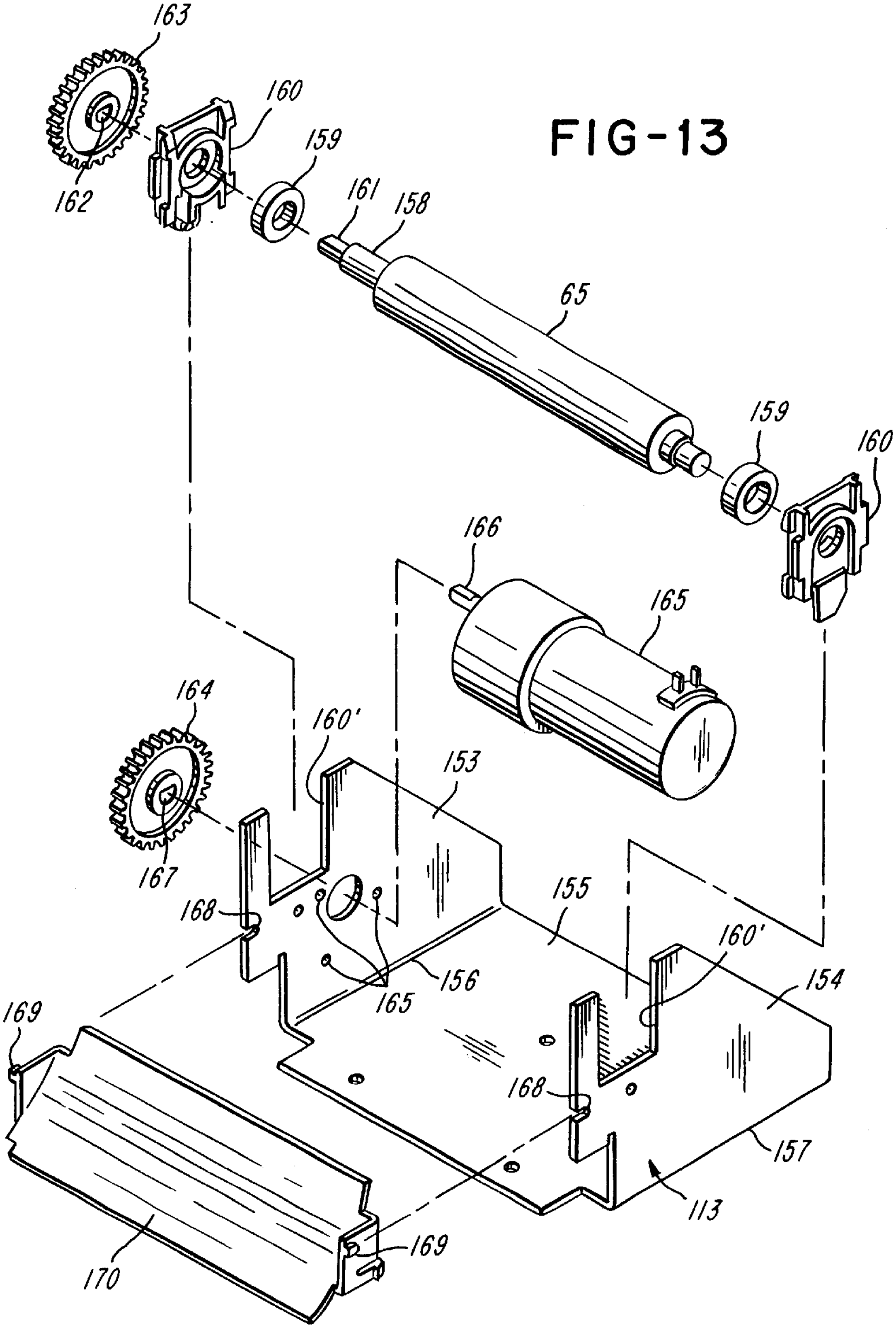
FIG. 13 is an exploded perspective view of a carrier web tensioning assembly or module including its subframe.
Figure 14:
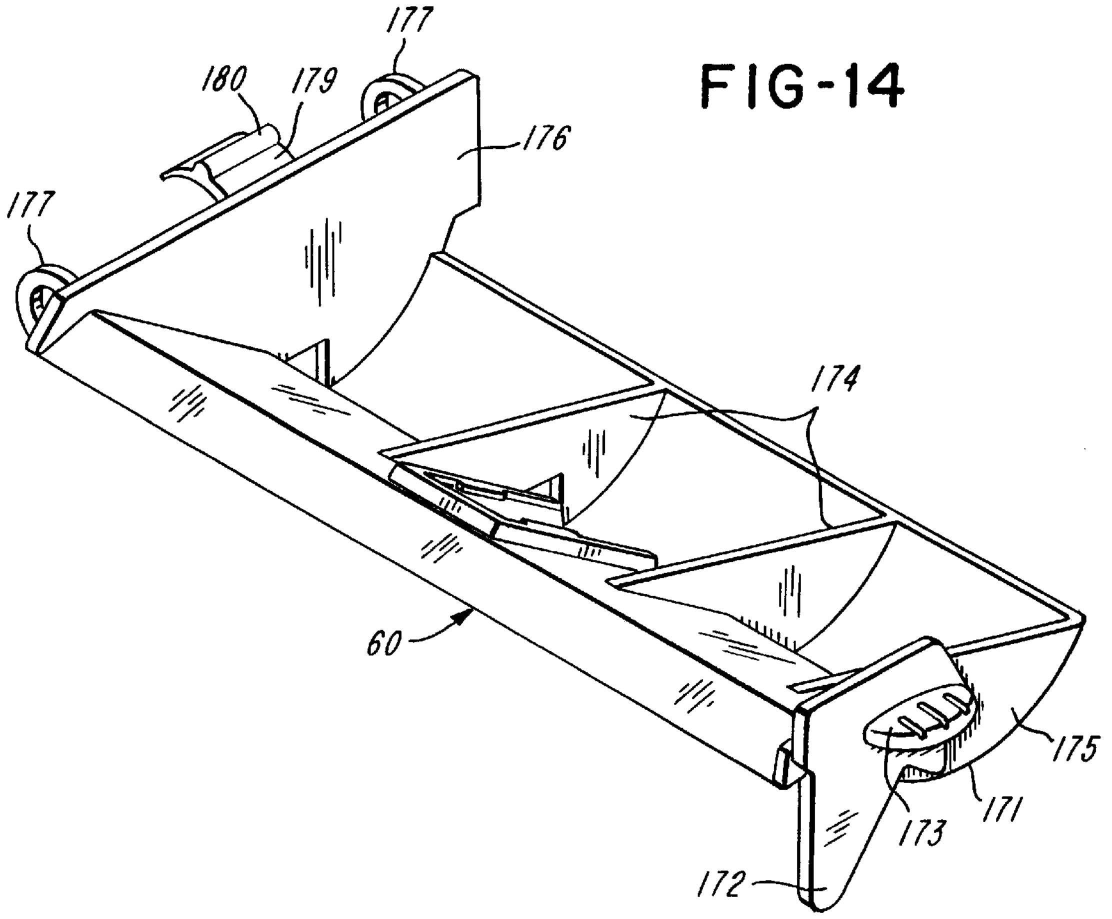
FIG. 14 is a perspective view of the record member guide.
Figure 15:
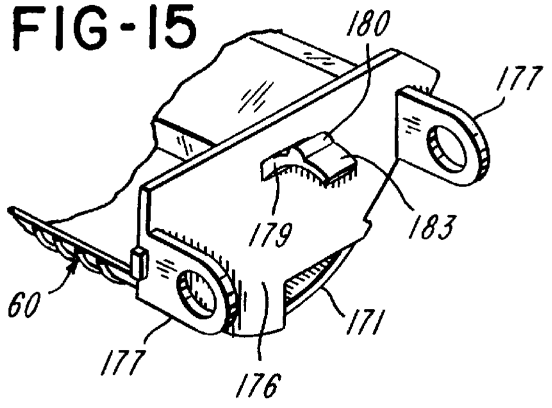
FIG. 15 is a perspective view of a fragmentary portion of the record member guide shown in FIGS. 7 and 14.
Figure 16:
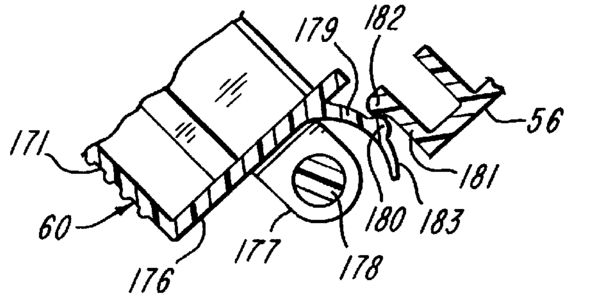
FIG. 16 is a sectional view showing the record member guide releasably latched to the mounting member in the open position.

With reference to FIG. 13, the subframe 113 is shown to have spaced upstanding parallel walls 153 and 154 joined by a bight portion 155 at bends 156 and 157. The drive roll 65 has a shaft 158 mounted in bearings 159. The bearings 159 are received in bearing blocks 160 which are identical to the bearing blocks 133. The bearing blocks 160 are received in cutouts 160'. The shaft 158 has a D-shaped portion 161 received in a D-shaped hole 162 in a gear 163. The gear 163 meshes with an identical gear 164 having a D-shaped hole 167. An electric carrier web pulling motor 165, which is actually a gear motor, secured to the wall 153 by screws (not shown) passing through holes 165' has a D-shaped output shaft 166. The shaft 166 is received in the D-shaped hole 167 in the gear 164. The motor 165 drives the drive roll 65 through the gears 164 and 163. It is noted that the gears 83, 84, 163 and 164 are located between the spaced apart vertical frame panel 71 and the vertical wall 126. The shafts 158 and 166 extend through horizontal cutouts 126' and 126" in the wall 126 (FIG. 12). Accordingly, the take-up structure or module shown in FIG. 13 can be readily inserted or removed. For example, the module shown in FIG. 13 is not needed if the record members RM are comprised of a web of tags (not shown) or if it is not desired to peel labels L from the carrier web W. The drive roll 65 has a frictional resilient surface to effectively grip the carrier web W as the carrier web W passes between the drive roll 65 and the spring-urged idler roll 66. The walls 153 and 154 have respective notches 168 for receiving projections 169 on an arcuate guide plate 170.

Figure 7:
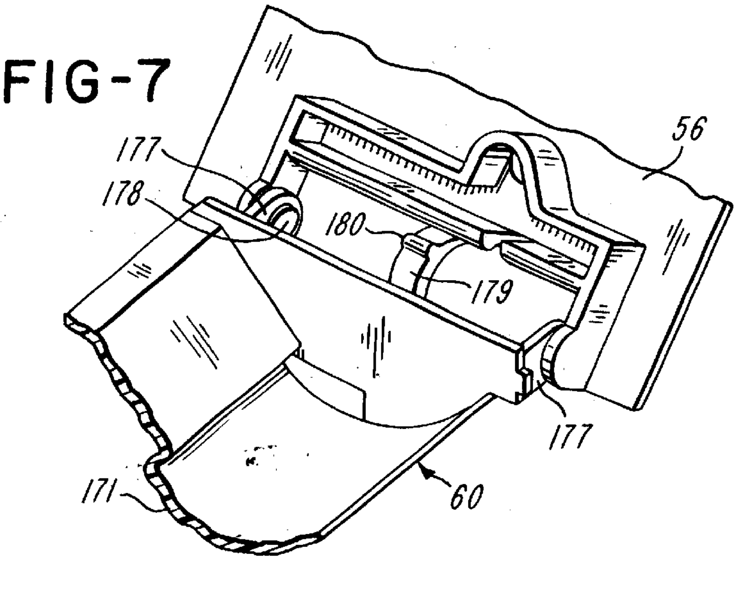
FIG. 7 is a fragmentary perspective view showing the mounting member in its open position and a record member guide in its lowered position.

With reference to FIGS. 7, 14, 15 and 16, there is shown the guide 60 which has a ribbed arcuate lower guide surface 171, a depending leg 172 and a handle 173. The guide 60 has a series of lateral ribs 174 and end walls 175 and 176 for increasing the strength of the guide 60. The end wall 176 has spaced connectors or hinge members 177. The mounting member 56 includes a pair of opposed studs or pins 178 received by the hinge members 177 to pivotally mount the guide 60 to the mounting member 56. The end wall 176 has a flexible resilient spring finger 179 having a detent projection 180. A flange 181 on the mounting member 56 has a depending detent projection 182. When the guide 60 is in its normal horizontal position, and the mounting member 56 is vertical, the leg 172 is resting in a trough 183 in the guide 62. The detent projections 180 and 182 are latched. When the mounting member 56 is raised to the fully open position shown in FIGS. 3 and 16, the guide 60 remains latched or detented to the mounting member 56. This facilitates loading of the web of record members RM into the printer. If, however, the user desires to lower the guide 60 while the mounting member 56 is still in its open or inclined position, the user can pivot the guide downwardly using the handle 173 as illustrated in FIG. 7. In order to return the guide 60 to the latched position, the user simply pivots the guide 60 upwardly by lifting the handle 173 until the spring finger 179 flexes and the projection 180 moves beneath the projection 182 into the position shown in FIG. 16. If desired, the flanges 181 can be constructed as a flexible resilient finger and the spring finger 179 could be made rigid. When the guide 60 is in the horizontal position and the mounting member 56 is in its open position, the guide 60 and the mounting member 56 can again become latched by simply pivoting the mounting member 56 to its vertical position. It should be noted that the spring finger 179 has a guide surface 183 which helps deflect the spring finger 179 when the spring finger 179 and the projection 182 move relative to each other to the latched position and prevents the spring finger 179 from bumping into the flange 181.

Figure 17:
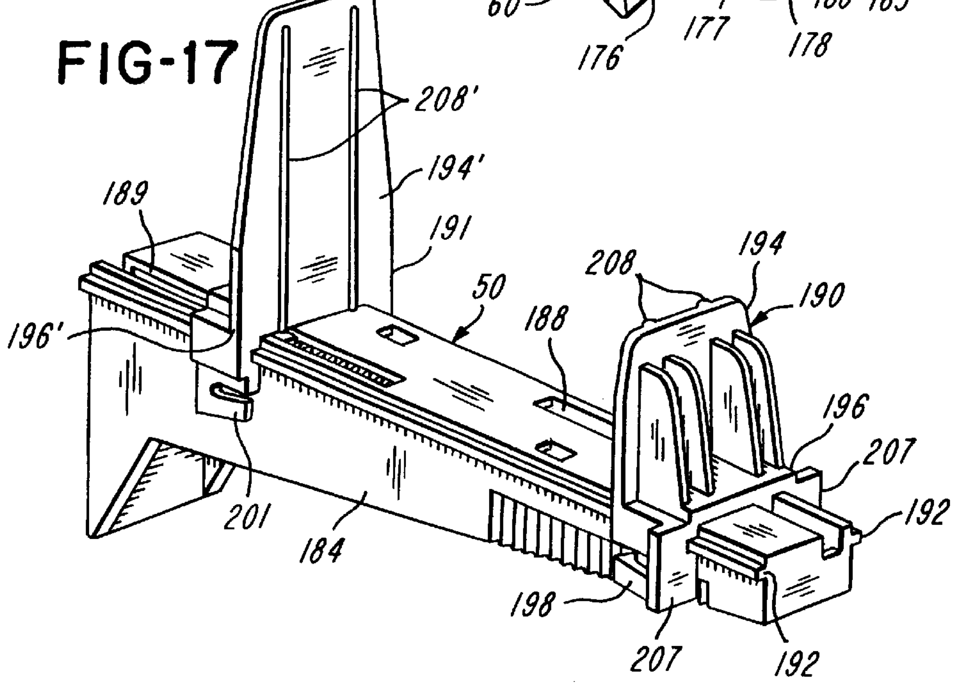
FIG. 17 is a perspective view of an adjustable guiding or mounting structure for a roll of record members.
Figure 18:
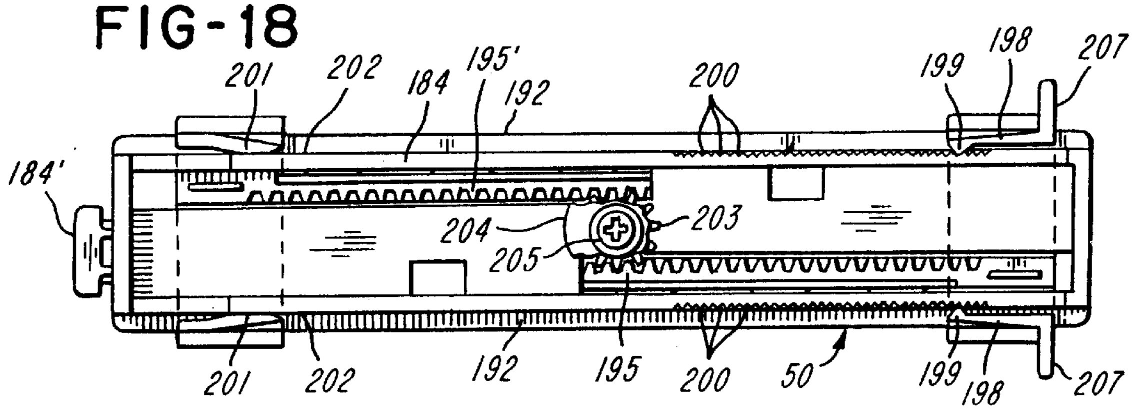
FIG. 18 is a bottom plan view of the structure shown in FIG. 17 for example.
Figure 19:
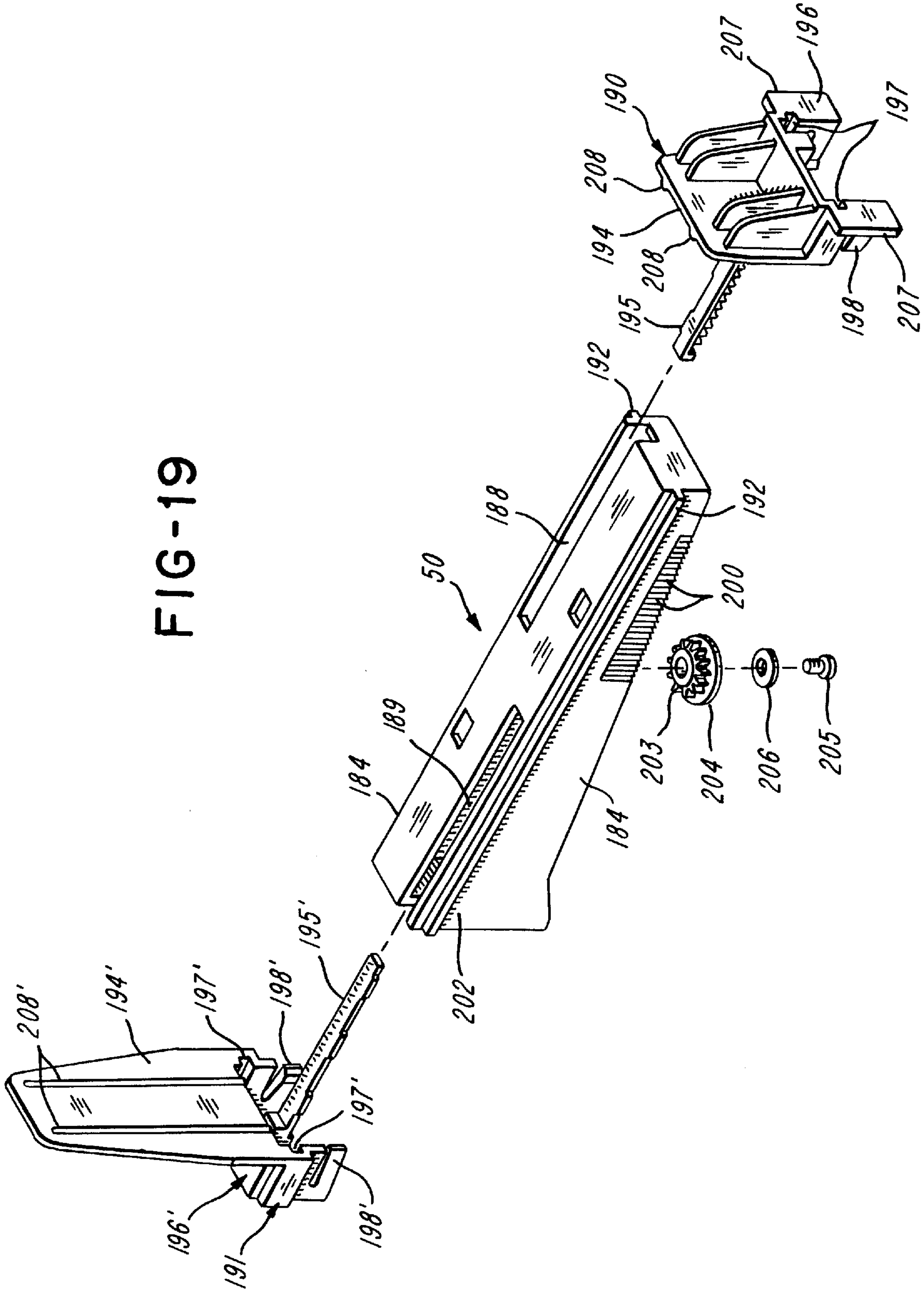
FIG. 19 is an exploded perspective view of the structure shown in detail in FIGS. 17 and 18 for example.

With reference to FIGS. 17, 18 and 19, the roll mounting assembly 50 is shown to have a body or mounting member 184 which is generally inverted-U-shaped in lateral section. As is common in prior art roll mounting members, the mounting member 184 is cantilever mounted. The mounting member 184 has a dovetail projection 184' received in a generally T-shaped slot 185 in the frame plate 71. To install the roll mounting assembly 50, the dovetail projection 184' is inserted into the wide upper portion 186 of the slot 185, and then the entire guide assembly 50 is moved downwardly until the dovetail projection 184' is seated in lower portion 187 of the slot 185. Thus, the mounting assembly 50 is releasably locked to the frame panel 71.

The mounting assembly 50 has a pair of longitudinally extending slots 188 and 189. A pair of guide members 190 and 191 are guided in the slots 188 and 189 for longitudinal movement. The mounting member 184 has a pair of outwardly and longitudinally extending flanges or guide elements 192. The guide member 190 has a vertical wall 194, a horizontally extending rack 195 and a guide member 196 joined to the wall 194 and the rack 195. The guide member 196 has an opposed pair of guide grooves 197 which receive the guide elements 192. The rack 195 is received in the slot 188. The guide member 196 has a pair of flexible resilient detent members 198 each having a tooth 199 cooperable with closely spaced vertical projections or ridges 200 on the mounting member 184. The detent members 198 exert forces inwardly toward each other and cooperate with the projections 200 to hold the guide member 190 in any selected longitudinal position.

The guide member 191 is similar to the guide member 190 in that it has a vertical wall 194', but which is substantially higher than the wall 194. The guide member 191 also has a guide member 196', a rack 195' and a pair of guide grooves 197' for receiving the guide flanges 192. The guide member 191 also has a pair of detent members 198' which bear against the side surfaces 202 adjacent the guide flanges 192. This eliminates play or slack between the guide member 191 and the mounting member 184. The racks 195 and 195' mesh with a pinion 203 having an integral washer 204. A screw 205 passing through a washer 206 and the pinion 203 is threaded into the underside of the mounting member 184. As shown, the guide member 190 has handles or ears 207 by which the guide member 190 can be manually grasped to slide the guide member 190 longitudinally on the mounting member 184. As the rack 195 moves, the pinion 203 rotates which in turn causes the guide member 196' to move toward or away from the guide member 196, depending upon the direction in which the guide member 190 is moved. The guide members 190 and 191 cause the roll R to be center-justified in the printer 40. The walls 194 and 194' have a pair of vertically extending ridges or projections 208 and 208' which limit the amount of contact between the sides of the roll R and the walls 194 and 194'.

It is noted that the guide 190 is smaller than the guide 191, in fact, the guide 190 is small enough so that the guide 190 can fit through the hole in the core 51. More particularly, the wall 194 is low whereas the wall 194' is substantially higher than the wall 194. Because the mounting member 184 is cantilevered, the roll R can be readily inserted onto the mounting member 184. As shown, the lateral extent of the wall 194 is substantially less than the lateral extent of the wall 194' with respect to the longitudinal extent of the elongate mounting member 184.

Figure 20:
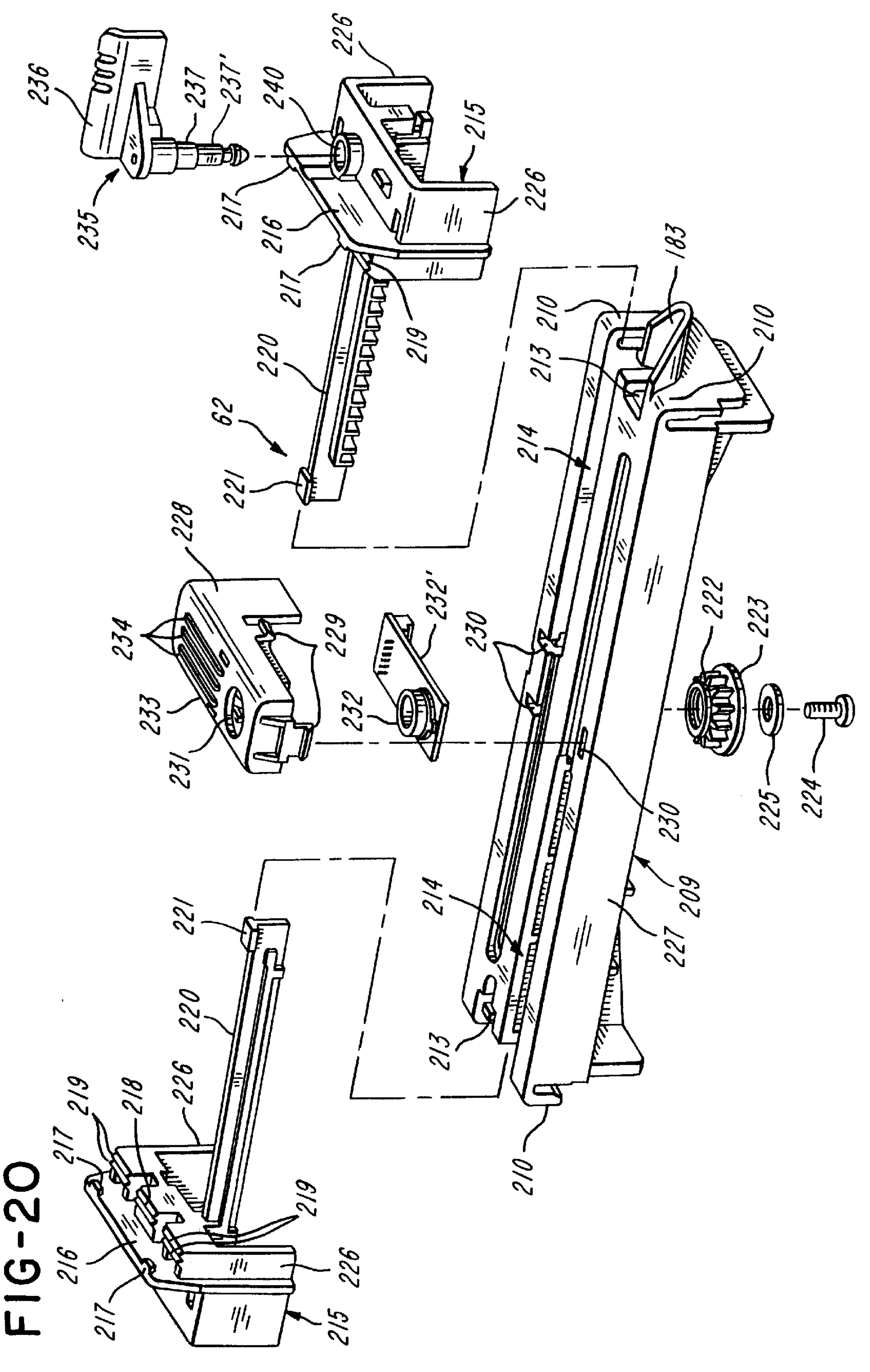
FIG. 20 is an exploded perspective view of guide structure for the web of record members.
Figure 21:
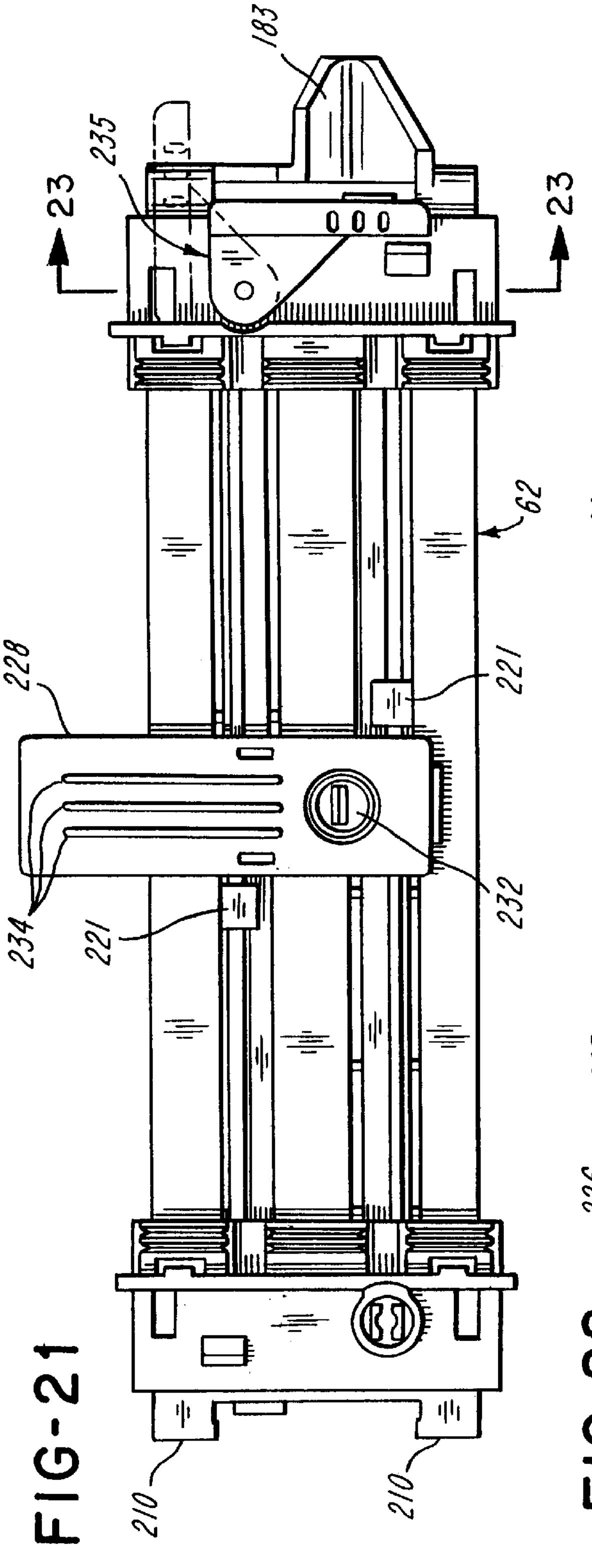
FIG. 21 is a top plan view of the guide structure shown in detail in FIG. 20 for example.
Figure 22:
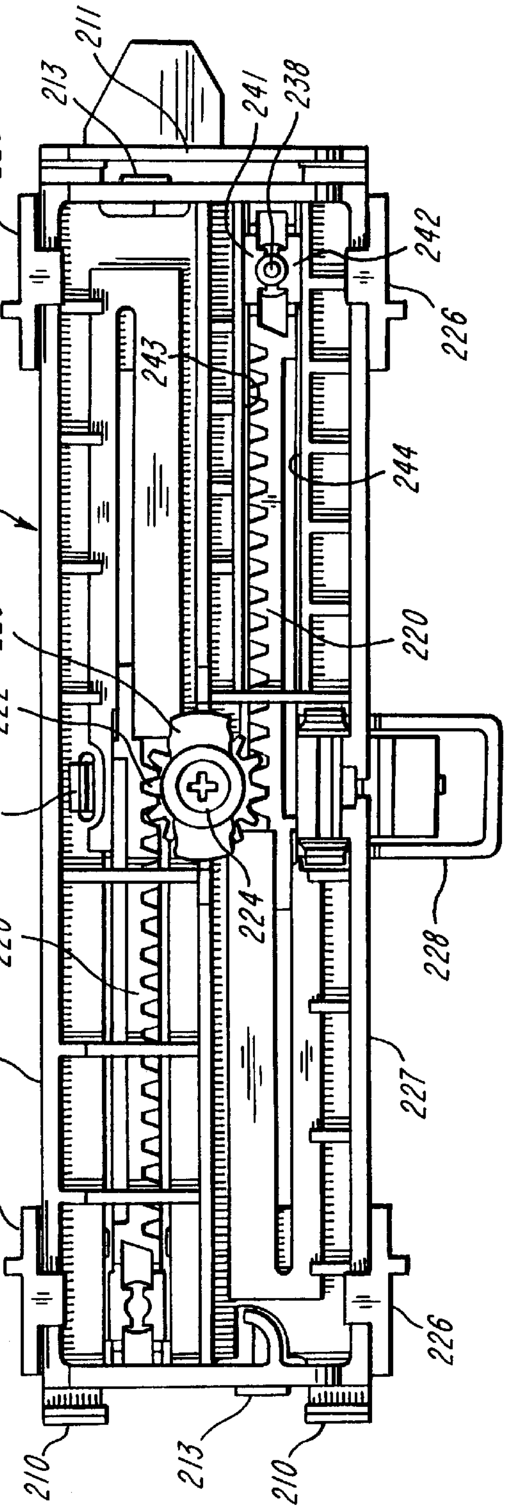
FIG. 22 is a bottom plan view of the guide structure shown in detail in FIGS. 20 and 21 for example.

With reference to FIGS. 20 through 23, and initially to FIG. 20, the guide assembly 62 includes a body or support 209 having hooks 210 received in notches 212 (FIG. 12) and projections 213 (FIG. 22) received in holes 213'. The support 209 has a pair of guide grooves 214. A pair of identical guide members 215 are mounted for movement on the support 209.

Each guide member 215 has a vertical wall 216 with a pair of projections 217 and an interrupted support surface 218 with ridges 219. The web of record members RM is supported on the ridges 219 of the support surfaces 218 beneath the projections 217. The wall 216 and the ridges 219 are formed integrally with a rack 220. Each rack 220 has a guide element 221 which keeps the racks 220 aligned with the slots 214. The racks 220 mesh with a pinion 222 which has an integral washer 223. A screw 224 passes through a washer 225, the washer 223 and the pinion 222 and is threaded into the support 209. The guide members 215 have depending flanges 226 which are in guided sliding contact with surfaces 227 of the support 209. The user can shift both guide members 215 simultaneously either toward or away from each other in unison by manually grasping one of the guide members 215 and moving it either toward or away from the other guide member 215.

An optical sensor holder 228 can be snap-fitted onto the body 209 by snaps 229 received in recesses 230. The holder 228 has a hole 231 into which an optical sensor 232 can project. The upper surface 233 of the holder 228 has ridges or projections 234. The ridges 234 are co-planar with the ridges 219. The ridges 219 and 234 guide the web of record members RM.

Figure 23:
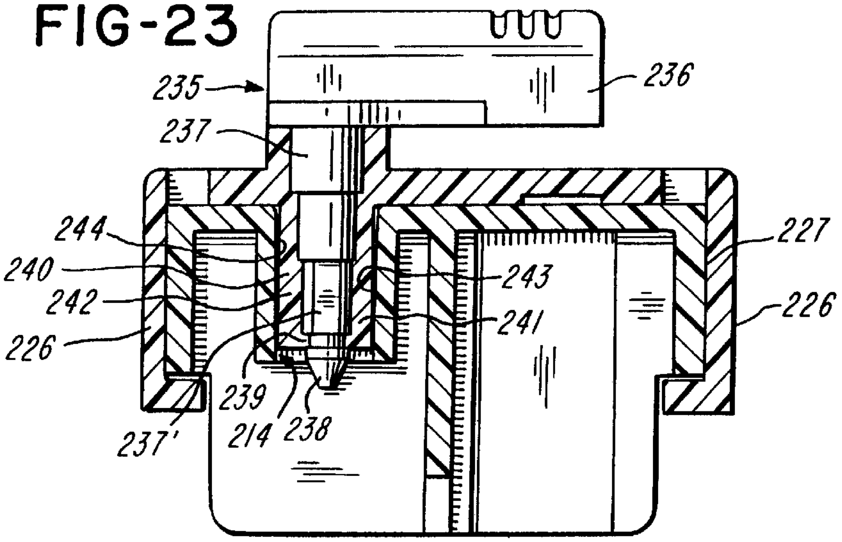
FIG. 23 is a sectional view taken generally along lines 23—23 of FIG. 21.

In order to hold or lock the guide members 215 in their adjusted positions, there is provided a brake generally indicated at 235. The brake 235 includes a handle 236 and a shaft 237 secured to the handle 236. The shaft 237 is stepped and includes a two-lobed cam 237'. The shaft 237 terminates in a head 238 snap-fitted over an inwardly projecting bead or ridge 239. The shaft 237 is received in a split tubular member 240. In FIG. 23 the brake 235 is shown in its locked position because the cam 237' is operative to spread apart opposed sections 241 and 242 of the tubular member 240.

As shown in FIG. 23, the groove 214 has walls 243 and 244, and when the shaft 237 is in the position shown, the sections 241 and 242 are urged against the walls 243 and 244 to frictionally lock the associated guide member 215 in its adjusted position. To release the brake or lock which the brake 235 exerts in the support 209, the handle 236 is pivoted counterclockwise 90 degrees from the position shown in FIG. 21. Thereupon, the cam 237' is rotated to an ineffective position at which the lobes of the cam 237' are no longer acting on the sections 241 and 242 so that the split tubular member 240 returns to its normal position and no longer exerts braking force on the walls 243 and 244 of the guide groove 214.

Because the guide members 215 are identical, the other guide member 215 also has the provision to receive a brake 235, however, this is unnecessary because the one brake 235 is sufficient to hold both guide members 215 in their adjusted positions. It is noted that the brake 235 is located on the guide member 215 which is at the outboard side of the printer 40 adjacent the wall 127 and is thus readily accessible to the user.

Figure 24:
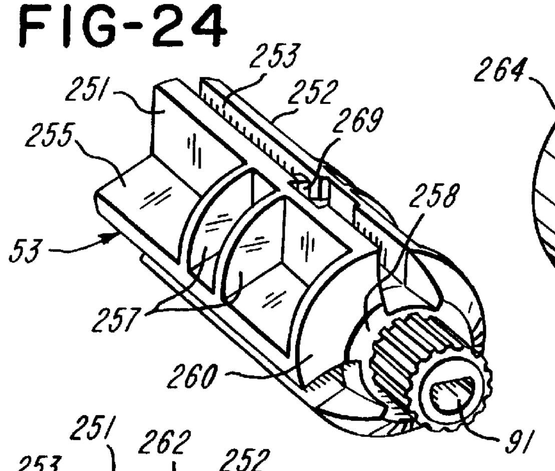
FIG. 24 is a perspective view of one of the spindles shown in FIG. 8 for example.
Figure 25:
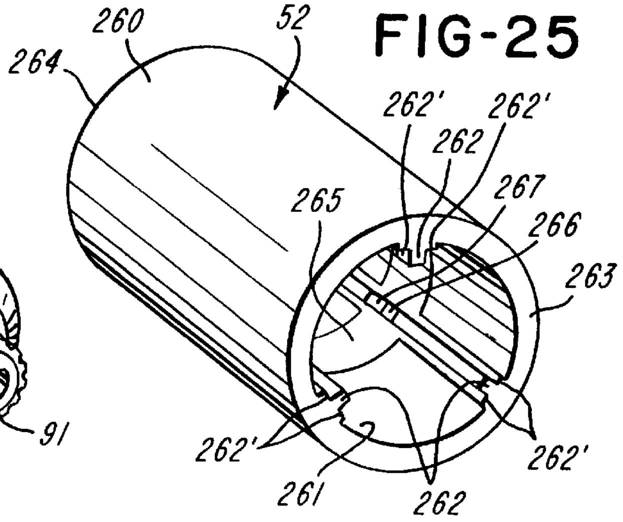
FIG. 25 is a perspective of a core adapted to be used with the spindle shown in FIG. 24.
Figure 27:
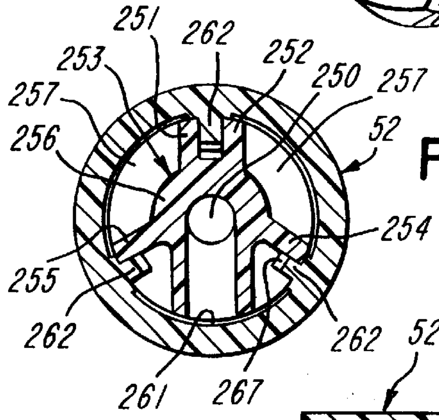
FIG. 27 is a sectional view taken generally along line 27—27 of FIG. 26.
Figure 26:
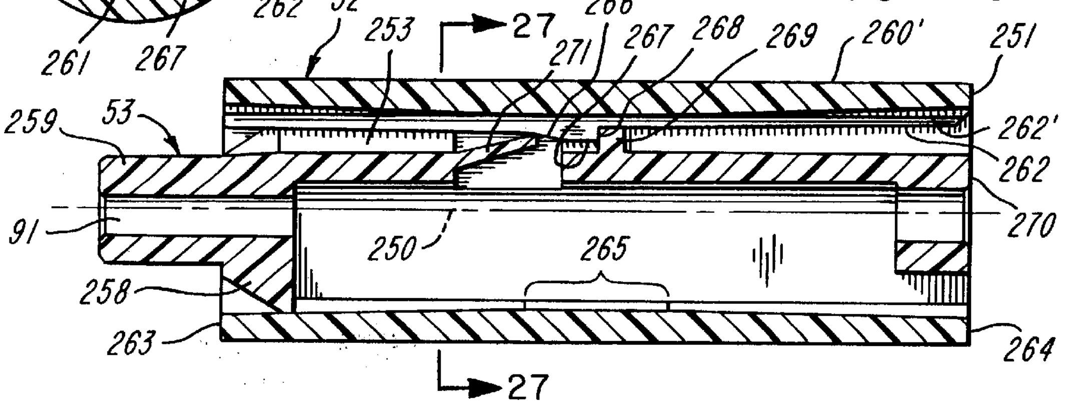
FIG. 26 is a sectional view of the core in position on the spindle.

With reference to FIGS. 24, 26 and 27, there is shown a one-piece molded plastics spindle, for example, the spindle 53. The spindle 53 has a longitudinally extending axis 250. The spindle 53 has a pair of spaced longitudinal wall members 251 and 252 which define a groove 253, and longitudinal wall members 254 and 255 peripherally spaced from the wall members 251 and 252. The wall members 251, 252, 254 and 255 are joined to a central hub 256. The periphery of the spindle 53 is cored as shown and has arcuate ribs 257 and an end or end wall 258. The end wall 258 is joined to a tubular end portion 259 and an inclined portion 260 to aid in insertion of the core 52 onto the spindle 53. The end portion 259 has the axial D-shaped hole 91. The outer surface of the end portion 259 has longitudinal fluting as shown to make the spindle 53 to be easily manually rotated.

As best shown in FIG. 27, the outer peripheries of the wall members 251, 252, 254 and 255 are curved and lie on a circle. The core 52 has a circular outer surface 260 on which the ink ribbon IR is wound and an inner generally circular surface 261. Extending radially inwardly from the surface 261 are preferably three integral, axially extending, identical, angularly spaced projections or ribs 262. The core 52 has opposite terminal ends 263 and 264. The inner surface 261 tapers slightly from the respective ends 263 and 264 toward the axis 250 up to a central axial surface portion 265. This tapering of the inner surface 261 facilitates molding of the core 52. There are lands 262' on each side of the ribs 262 which have no taper. The outer surfaces of the walls 251, 252, 254 and 255 are in supported contact with the lands 262'. Because of lack of taper of the outer surfaces of the walls 251, 252, 254 and 255 and lack of taper of the lands 262', the core 52 is well supported on the spindle 54 without excessive play or slack.

Each rib 262 has a ramp 266 which is inclined inwardly toward the axis 250 and away from the end 263 and toward the end 264. Each ramp 266 terminates at a land 267, and the land 267 terminates at an abutment face or stop face 268. The spindle 53 has an outwardly extending abutment or stop 269 disposed in the groove 253 approximately one-half way between end wall 258 and terminal end 270. The spindle 53 has an integrally formed, flexible, resilient spring finger 271, which extends outwardly away from the end 263 and away from the axis 250. The spring finger 271 is disposed in the groove 253 in alignment with the stop 269. When the core 52 is being inserted onto the spindle 53, the end 264 is generally aligned with the end portion 259 and the core 52 is rotated until one of the ribs 262 is aligned with the groove 253 and another rib 262 is against one side of the wall member 254 and yet another rib 262 is against one side of the wall member 255. Thereupon, the core 52 is slid onto the spindle 53 until the abutment face 268 is against the abutment 269. The spring finger 271 deflects or is cammed inwardly as the core 52 is slid into position over the land 267 and the spring finger 271 deflects outwardly as the spring finger 271 moves in contact with the ramp 266. In the operating position of the core 52 relative to the spindle 53, the spring finger 271 is slightly deflected from its free as-molded state and bears against the ramp 266 and holds the core 52 on the spindle 53. When it is desired to remove the core 52 from the spindle 53, the core 52 is pulled to the left in FIG. 26 and thus the spring finger 271 deflects inwardly as the ramp 266 moves to the left until the spring finger 271 moves off the land 267, whereupon the spring finger 271 deflects outwardly again. It is apparent that when the core 52 is in the operating position on the spindle 53, the wall members 251, 252, 254 and 255 and the cooperating ribs 262 hold or lock the core 52 on the spindle 53 against relative rotation and the spring finger 271 cooperating with the ramp 266 releasably holds the core 52 in position at which the abutment face 268 is against the abutment 269.

Both the spindle 53 and the core 52 are of one-piece molded plastics construction. Initially, a core 52 with a full spool SR of ink ribbon IR is mounted on the spindle 53, and an empty core 54 is mounted on the spindle 55. Some ink ribbon IR is manually wound onto the empty core 54. As the printer 40 operates, the motor 75 causes rotation of the spindle 55 and the core 54 to maintain tension in the ink ribbon IR between the print head 69 and the cooperating platen roll 63 and the core 54. The motor 74 operates to control the spindle 53 and the core 52 in order to apply the proper forces to the ink ribbon IR. As the printer 40 continues to operate, more and more of the ink ribbon IR is unwound from the core 52 and wound onto the core 54. When the ink ribbon IR has been completely or nearly completely spent or paid out from the core 52, the printer is ready to be reloaded with a new supply of ink ribbon IR. The now full spool TR on the core 54 is removed from the spindle 55 and the empty core 52 is removed from the spindle 53. The empty core 52 is now loaded onto the spindle 55 and a full ink ribbon roll on a core like the core 52 is loaded onto the spindle 53. So each time a core 52 on the spindle 53 is empty, that core 52 is removed and is used as the take-up core on the spindle 55.

Figure 28:
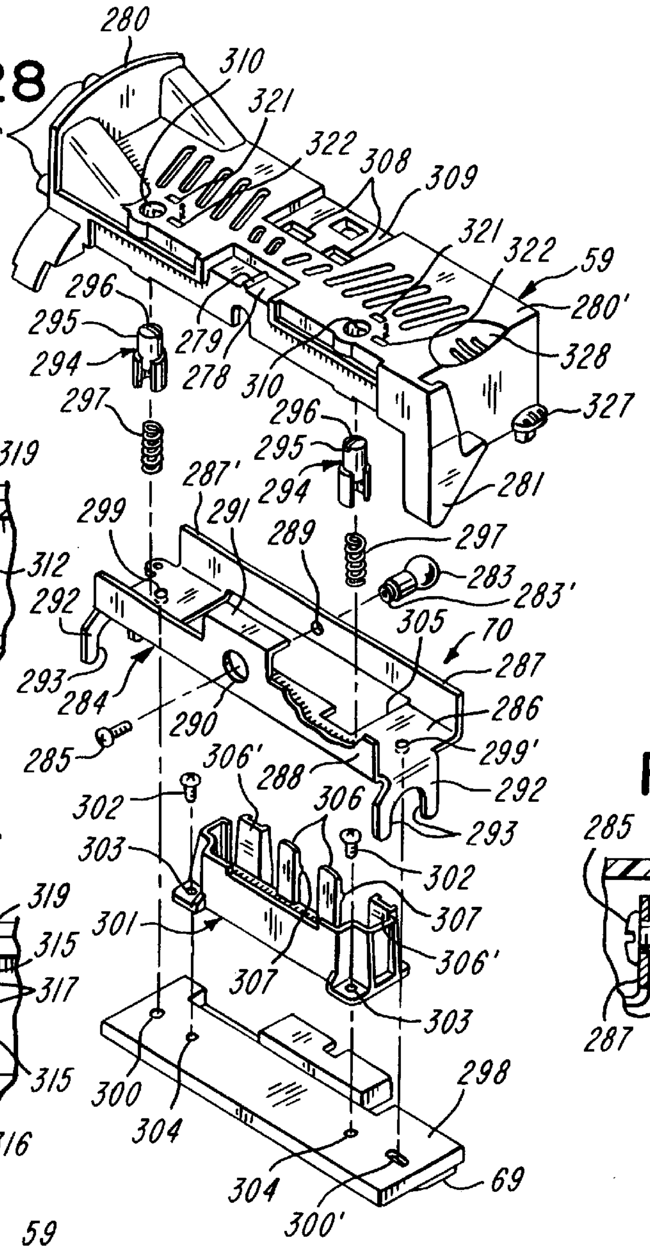
FIG. 28 is an exploded perspective view of the print head assembly and its cantilevered support.
Figure 32:
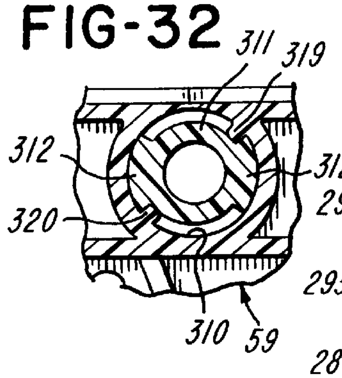
FIG. 32 is a sectional view through the adjusting device.
Figure 31:
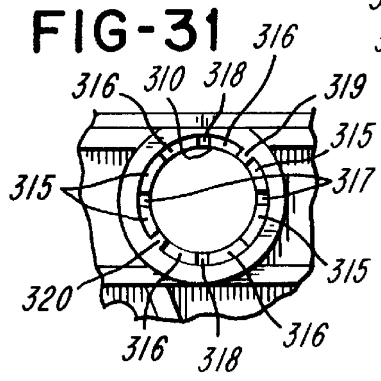
FIG. 31 is a fragmentary bottom plan view showing the sculptured bore for receiving the adjuster of the adjusting device.
Figure 29:
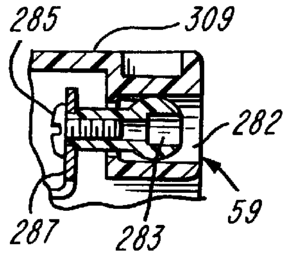
FIG. 29 is a fragmentary view showing the manner in which the print head can gimble in the support.
Figure 30:
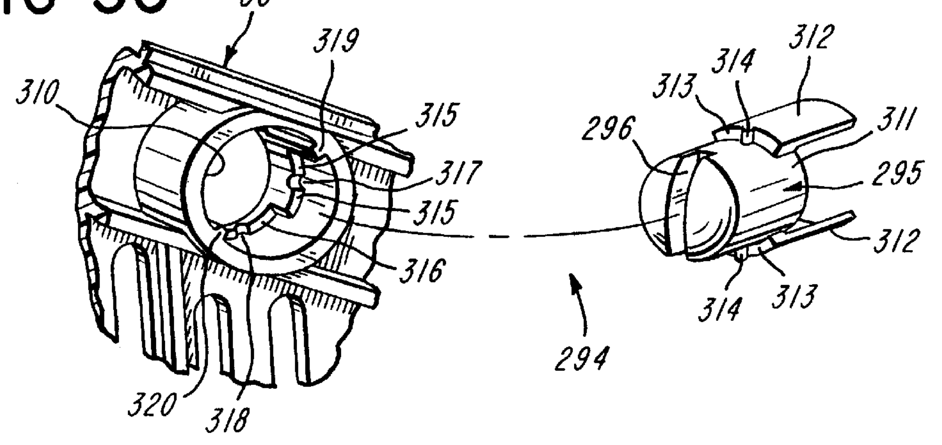
FIG. 30 is a rotated perspective view showing two components of one two-position adjusting device.

With reference to FIGS. 28 and 29, the print head assembly 70 is mounted to the cantilevered support or bracket 59. The bracket 59 has three spaced studs 276 which are snugly received in holes 277 in the mounting member 56 (FIG. 8). The bracket 59 has a recess 278 with a rounded projection or pivot edge 279 disposed in the recess 278. The recess 278 is disposed approximately midway along the length of the bracket 59. The free end portion 280' of the bracket 59, which is opposite to end portion 280, has a latch member 281. The bracket 59 has a socket 282 in lateral alignment with the laterally extending projection 279. The socket 282 receives a ball-shaped member 283 which is secured to a metal mounting member 284 by a screw 285 The mounting member 284 is generally U-shaped in construction and has a bight 286 and upstanding vertical walls 287 and 288. The wall 287 has a hole 289 through which a pilot boss 283' of ball-shaped member 283 extends. The wall 288 has a hole 290 laterally aligned with the hole 289 through which a screw driver can be inserted to tighten or loosen the screw 285. The wall 288 has a bent over tab or flange 291 received in the recess 278. The underside of the flange 291 contacts the projection 279. The mounting member 284 is capable of rocking or canting in a vertical plane about the projection 279 where contact is made with the flange 291 and about the place where the socket or pocket 282 receives the ball-shaped member 283. The mounting member 284 can also adjust in a horizontal plane as the mounting member 56 is moved from its open position to the closed position. In particular, the mounting member 284 has a pair of depending forked locating members 292 each of which has parallel guide walls 293 for receiving and locating on bearings 134 (FIG. 12). In this way the mounting member 284 and, indeed, the print head 69 are accurately located in parallel with respect to the axis of the platen roll 63.

A pair of adjusting devices 294 are used to adjust the forces exerted by the bracket 59 against the mounting member 284 and in turn which the print head 69 exerts against the web of record members RM and the platen roll 63. The adjusting devices 294 each includes an adjusting member 295 having a slot 296 and a spring 297 which bears against the upper surface of the bight portion 286. The projection 279 and the ball-shaped member 283 are preferably located midway between the places where the springs 297 contact the bight portion 286.

The print head 69 is mounted on the underside of a print head support plate 298. The plate 298 is preferably constructed of metal such as aluminum and acts as a heat sink. The bight portion 286 has depending integrally formed depending projections or dimples 299 and 299' received in holes 300 and 300' in the plate 298. The hole 300' is an elongate slot which extends lengthwise of the plate 298. A connector 301 is secured to the plate 298 by screws 302 passing through holes 303 and threadably received in holes 304 in the plate 298. The connector 301 is received in a hole or opening 305 in the bight portion 286. The connector 301 has flexible, resilient, manually deflectable, upstanding spring fingers 306 with projections 307. The spring fingers 306 extend through the hole 305. The projections 307 rest on upper edge 287' of the wall 287 and upper portions of the spring fingers 306, extend through holes 308 in the bracket 59. The spring fingers 306 are manually engageable and when moved to the left as seen in FIG. 28, the projections 307 release from the edge 287'. Upstanding rigid fingers 306' fit against the outside of the flange or wall 287. Thus, the wall 287 is straddled by the two spring fingers 306 and by the two rigid fingers 306'. As is apparent there is a snap-fit connection to hold the print head 69, the plate 298 and the connector 301 to the mounting member 284. The connector 301 tapers slightly inwardly and upwardly as viewed in FIG. 28 which allows the connector 301 to be easily inserted into the opening 305. When the connector 301 is fully inserted into the opening 305, the connector 301 makes a snug fit with the side edges of the opening 305. Thus, is readily apparent that the print head 69, the plate 298, the connector 301 and the mounting member 284 moves as a unit on the support 59. The locating members 292 are guided into place on the bearing 134 as the print head is moved into its closed or operating position. This unit can gimble in the horizontal and vertical planes with respect to the support 95. The bracket 59 and the connector 301 in their assembled condition, are held to the bracket 59 against the forces of springs 297. However, when the print head assembly 70 is brought into the closed position, when the forked members 292 are guided by the bearings 134, the springs 297 compress and the print head 69 aligns with the axis of the platen roll 63.

Each adjusting member 295 is received in an axial bore 310 in the bracket 59. The adjusting member 295 has a cored out axially extending, right-circular cylindrical body 311 and a pair of diametrically opposed arcuate members 312. The members 312 receive a portion of the length of the springs 297. Each spring 297 abuts the respective body 311. Upper surfaces 313 of the members 312 have detent teeth 314. Each bore 310 has axially spaced surfaces 315 and 316 with respective recesses 317 and 318. The bore 310 also has two inwardly extending rotation limiting ridges or projections 319 and 320. The adjusting device 295 can fit into the bore 310 in two different rotational positions. In one position the projections 314 are received in notches 317 to cause the springs 297 to exert high forces against the bight portion 286 and in another position the projections 314 are received in notches 318 to cause the springs 297 to exert low forces against the bight portion 286. The adjustment is made by inserting a coin or a screw driver in the slot 296 and exerting a force to compress the spring 297. By depressing the adjusting member 295 and rotating the adjusting member 295 until the projections 314 are in alignment with the other recess 317 or 318, as the case may be, the spring force adjustment is made. The two-position adjustment is made to accommodate webs of record members RM of different widths. For a wide web, for example, a web of four inches in width, high force is required and thus the projections 314 are to be received in recesses 317. For a narrow web, for example, a web of two inches in width, lower force is required and thus the projections 314 are to be received in recesses 318. As seen, the adjusting devices 294 are individually adjustable. There are marks 321 and 322 on the bracket 59.

FIG. 28 illustrates one adjusting device 294 as having its slot 296 aligned with the mark 322 and the other adjusting device 284 as having its slot 296 aligned with the mark 321. When the slots 296 are aligned with the marks 321, then the projections 314 are in the recesses 318, and when the slots 296 are aligned with the marks 322, then the projections 314 are in the recesses 317. During use of the printer 40, both of the adjusting members 295 should either be adjusted to align with the marks 321 or 322, so that both adjusting devices have their projections 314 in either recesses 317 or 318 and accordingly both springs 297 will exert the same spring forces against the bight portion 286. The two-position adjustment is preferred in that the user is not likely to have the spring forces out of adjustment as in the case of a variable-type adjustment such as a screw-type adjustment.

As shown in FIGS. 2, 3 and 6, a movable latch device 323 has a knob 324 and an integral latch member 325. The latch member 325 is mounted on a post 323' (FIG. 10) and is spring-urged counterclockwise. The latch member 325 can be latched with latch member 281 as shown in FIG. 2. Movement of the latch member 325 is limited by a projection (not shown) on the latch member 325 projecting into a slot 323" in the wall 127. A spiral spring 329 received on the post 323' has one end portion 330 received in a hole in the wall 127 and its other end portion attached to the latch member 325. The latch member 325 has a cam face 332 terminating at a tooth 333. The tooth 333 can cooperate with a tooth 334 of the latch member 281. The cam face 332 can cooperate with a cam face 335 on the latch member 281.

Figure 9:
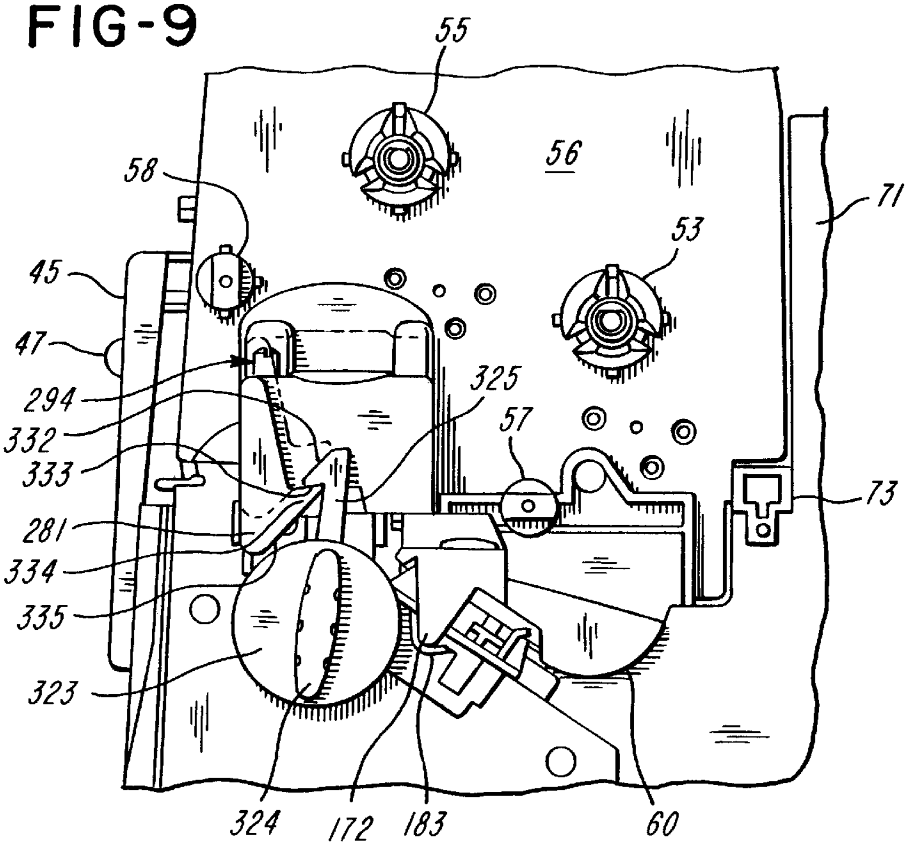
FIG. 9 is a fragmentary elevational view showing the structure shown in FIG. 8 in accordance with other components of the printer.

In FIGS. 2 and 9 the latch members 281 and 325 are shown to be latched in that the teeth 333 and 334 cooperate. In this position, namely, the latched position, the springs 297 (FIG. 28) are somewhat compressed and the print head 69 is aligned with the axis of the platen roll 63. In this position, a magnet 336 (FIG. 5) on the mounting member 56 cooperates with a magnetically responsive sensor 337 on the circuit board 82 to signal the electronics that the print head 69 is in its printing position. When the latch member 325 is in other than its latched position, the mounting member 56 is not in its vertical position and thus the magnet 336 and the cooperating sensor 337 will signal that the print head 69 is open and should not be energized. Pivoting the manually engageable knob 324 clockwise (FIGS. 2 and 9 for example) will cause the tooth 333 to lose contact with the tooth 334 and the springs 297 (FIG. 28) will cause the mounting member 56 to pivot slightly from the vertical position. The cam face 332 (FIG. 9) will now be against the cam face 335. The force exerted by the spiral spring 329 (FIG. 10) will hold the mounting member 56 slightly inclined with respect to the vertical. To latch the latch 326, the user can apply a manual downward force against the recess 328 (FIG. 28) of the support 59, and this causes the cam face 335 acting on the cam face 332 to move the latch member 325 clockwise against the force of the spiral spring 329 until the teeth 333 and 334 cooperate when the latch member 325 moves counterclockwise. To release latch 326 formed by the latch members 281 and 325, the knob 324 is pivoted clockwise (FIG. 2). When it is desired to move the mounting member 56 and its associated components to the raised position shown in FIGS. 3 and 6, the latch 326 is opened and the user can engage a handle 327 on the bracket 59 to pivot the mounting member 56. To return the latch 326 to the latched position shown in FIG. 2, the user can either use the handle 327 or can apply a downward-depressing force to a recess 328 on the support 59 until the latch members 281 and 325 become latched.

It is preferred that the printer 40 be comprised of molded plastics material except for the frame member 72, base plate 120, subframes 112 and 113, peel bar 138, mounting member 284, certain parts of the printed circuit board 82 and 232' various screws such as 205, 224, 142, 149, 299, 285, 302 and 124, washer 225, shafts 57', 89, 85 and 158, electric motors 74, 75, 76 and 165, bearings 94, 94', 95, 95', 134 and 159, E-ring 137, and springs 297.

Figure 33:
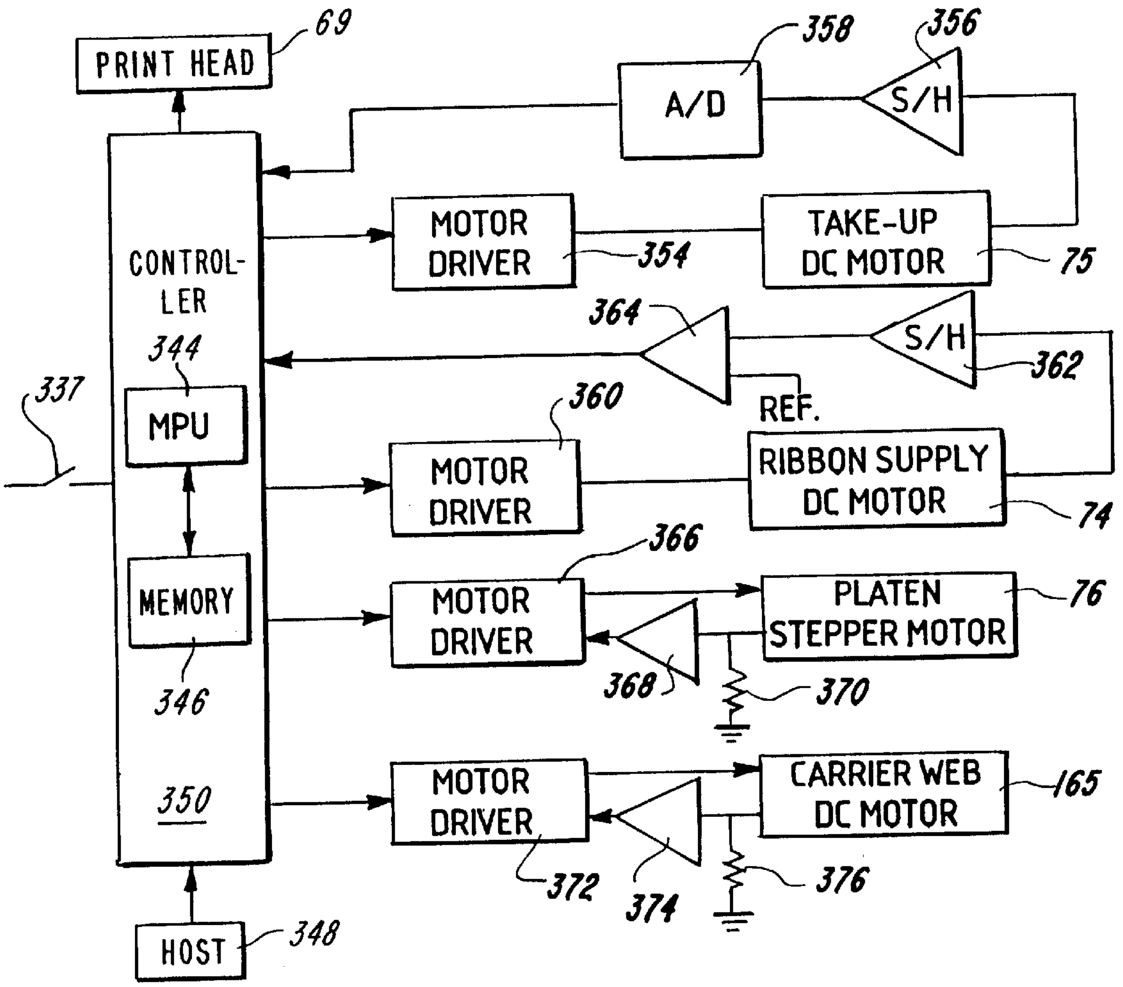
FIG. 33 is a block diagram illustrating the electrical controls of the printer.

FIG. 33 illustrates the electronic control of the printer 40 of the present invention. A controller 350 includes a microprocessing unit MPU 344 that operates in accordance with software and look-up tables stored in a memory 346 so as to control the print head 69 to print and to control the respective motors 74, 75, 76 and 165. In order to control the operation of the motors 74 and 75 respectively driving the ink ribbon supply spool SR and take-up spool TR, the memory 346 stores a number of look-up tables. These look-up tables contain various ramp-up and ramp-down constants for both the forward and reverse directions of ink ribbon movement as well as constants for controlling the amount of motor torque needed to maintain a desired tension in the ink ribbon IR for each of a number of different ink ribbon widths and diameter ranges. The memory 346 also stores one or more look-up tables that correlate back EMF with a number of ink ribbon diameter sectors wherein each sector is associated with a range of spool ink ribbon diameters. For example, a sector 0 is associated with an empty spool. A sector 1 is associated with a slight amount of ink ribbon IR wound upon the spool i.e. small diameters of ink ribbon and so on up until a maximum sector that is associated with a full spool, i.e. a spool with the largest diameters of ink ribbon IR. The controller utilizes these look-up tables to determine the range of diameters within which the ink ribbon supply and/or take-up spools fall based upon the monitored back EMF of one of the motors 74 or 75. The controller 350 thereafter utilizes the determined ink ribbon diameter range and the selected width of the ink ribbon IR to obtain the constants for controlling the torque of the motors 74 and 75 to maintain a desired tension in the ink ribbon IR.

As discussed above, the printer of the present invention is capable of supporting and utilizing composite webs C of various widths as well as ink ribbons IR of various widths. The controller 350 receives format information from a host computer 348 or the like that identifies the width of the composite web C as well as the width of the selected ink ribbon IR among other information necessary to print a label L. The format information including the selected width of the composite web C and ink ribbon IR can also be entered by a keyboard or the like if desired.

The controller 350 controls the ink ribbon take-up motor 75, the ink ribbon supply motor 74, the platen motor 76 and the carrier web motor 165 via respective motor drivers 354, 360, 366 and 372. In order to constantly monitor the diameter of the ink ribbon IR on the spools SR and TR, the controller 350 monitors the back EMF on either the ink ribbon supply motor 74 or on the take-up motor 75. In the embodiment depicted, the controller 350 samples the back EMF on the take-up motor 75 by turning off the motor 75 for a short period of time such as 2 milliseconds with the sampled back EMF temporarily held in a sample/hold amplifier 356. An analog to digital converter 358 converts the analog representation of the back EMF of the take-up motor 75 to a digital representation thereof that is coupled to the controller 350. The controller 350 utilizes the sample back EMF to determine the diameter of the ink ribbon IR on the take-up spool TR. The diameter of the take-up spool TR in turn determines the diameter of the ink ribbon IR on the supply ribbon spool SR. The end of an ink ribbon IR or a break in the ink ribbon IR can be determined by detecting either a stall i.e. zero back EMF on the take-up motor 75 or an overspeed condition on the ink ribbon supply motor 74. For the latter determination, the ink ribbon supply motor 74 is coupled to a sample and hold amplifier 362, the output of which is coupled to a comparator 364. The comparator 364 compares the output of the sample and hold amplifier 362 to a reference signal wherein the comparator 364 outputs an overspeed signal to the controller 350 if the reference signal is exceeded by the output from the sample and hold amplifier 362. A current feedback path is provided from the platen motor 76 to the associated motor driver 366 by an amplifier 368 and resistor 370. Similarly, an amplifier 374 and resistor 376 provide a current feedback path for the carrier web pulling motor 165.

Figure 34A:
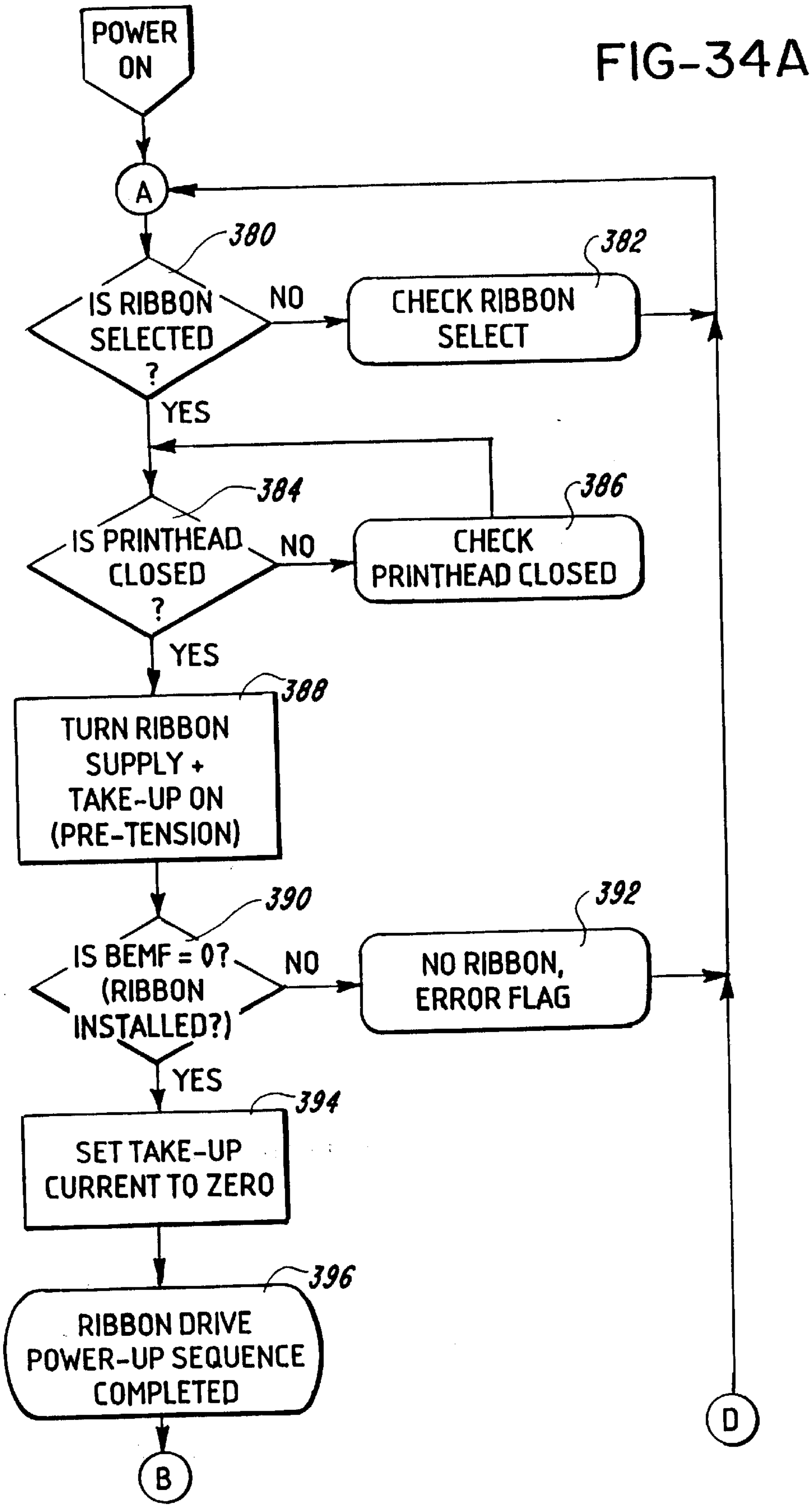
FIGS. 34A–C form a flow chart illustrating an ink ribbon drive routine for the forward direction.

The ink ribbon drive power up routine implemented by the microprocessor 344 is illustrated in FIG. 34A. When power is first supplied to the printer 40, the microprocessor 344 determines at a block 380 whether an ink ribbon is present in the printer 40. The microprocessor 344 determines this from the monitored back EMF of the motor 75 which will be high if no ribbon is present. If an ink ribbon IR is present, the back EMF will be zero representing a stalled condition. If an ink ribbon IR is not detected at block 380, the microprocessor proceeds to block 382 to check the ribbon select information to determine whether the printer 40 is being operated in a thermal direct mode in which an ink ribbon is not employed. If the microprocessor 344 determines at block 382 that a thermal transfer printing operation requiring an ink ribbon is to be performed but no ink ribbon is detected, the printer 40 will provide an error indication. If the microprocessor 344 determines at block 380 that the ink ribbon is present and the thermal transfer operation has been selected, the microprocessor proceeds to block 384. At block 384, the microprocessor 344 determines whether the print head 69 is closed as indicated by a switch 337 coupled to the controller 350 as shown in FIG. 33. If the switch 337 indicates that the print head 69 is not closed, the microprocessor 344 proceeds to block 386 to wait until the print head 69 is closed prior to turning on the motors. Once the print head is determined to be closed, the microprocessor proceeds from block 384 to block 388.

The microprocessor 344 at block 388, turns on the take-up motor 75 to drive the motor 75 in a wind-up direction. At block 388, the microprocessor 344 also controls the ink ribbon supply motor 74 to turn on but the ink ribbon supply motor 74 is driven in the opposite direction from the take-up motor 75 to apply a pretension to the ink ribbon IR so as to take up any slack therein. The motors 74 and 75 are thus driven in the opposite directions until the microprocessor 344 determines at block 390 that the back EMF on the take-up motor 75 is zero indicating that the ink ribbon is stalled. If the microprocessor 344 determines that the back EMF does not reach zero but is high, indicating no ribbon such as will occur in the event of an ink ribbon break, the microprocessor 344 sets an error flag at block 392. Once the microprocessor 344 determines that the back EMF is equal to zero indicating that there is enough tension in the ink ribbon IR, the microprocessor 344 at a block 394 sets the current to the take-up motor 75 to zero so as to turn off the take-up motor 75. It is noted that the supply motor 74 is preferably not turned off at this time but is controlled so that a minimum amount of current is provided via the motor driver 360 to the ink ribbon supply motor 74 to maintain a minimum tension in the ink ribbon. This pretensioning prevents smudging that may occur from a slack ink ribbon upon a subsequent start up. Thereafter, the microprocessor 344 determines at block 396 that the ink ribbon drive power up sequence is completed and continues to block 400 of FIG. 34B.

Figure 34B:
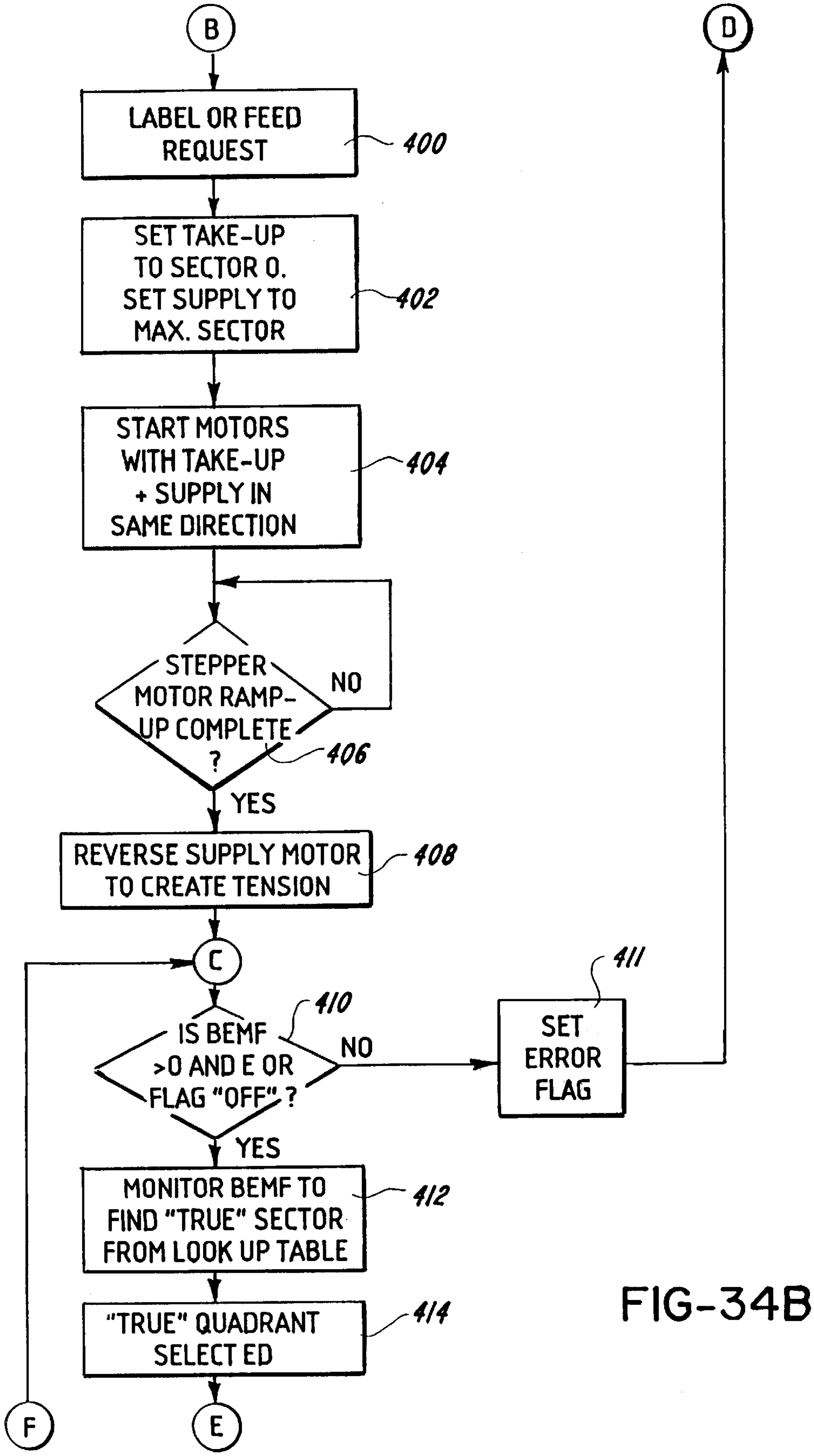
Figure 34C:
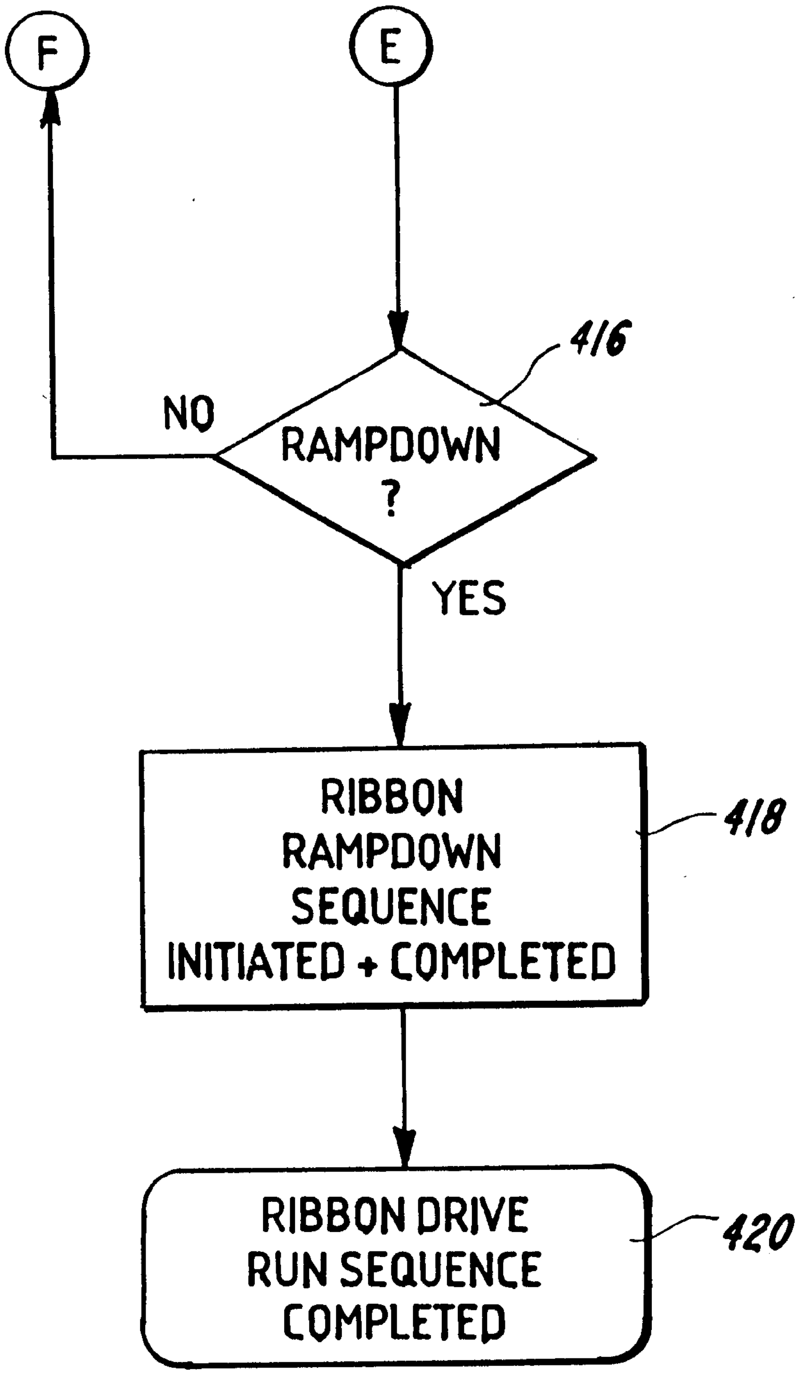

In the ink ribbon drive run sequence depicted in FIG. 34B, the microprocessor 344 waits at block 400 for a label request or a feed request. Once such a request is received, the microprocessor 344 proceeds to block 402. At block 402, the microprocessor 344 sets the diameter of the take-up spool to sector zero indicating an empty take-up spool and the microprocessor 344 also sets the diameter of the supply spool SR to the maximum sector indicating a full ink ribbon supply spool SR. The settings of block 402 are default settings that are utilized prior to running the ink ribbon take-up and supply motors since the diameter of the ink ribbons on the respective spools is at this point not known. At a block 404, the microprocessor 344 starts the motors 74 and 75 in the same direction so that the take-up motor is pulling the ink ribbon IR in a direction to wind the ribbon IR up on the take-up spool TR and the supply motor 74 is helping to overcome the inertia of the supply spool SR by driving the supply spool SR so as to unwind the ribbon IR from the supply spool SR. Once the inertia of the large diameter supply spool SR is overcome, as determined by the microprocessor 344 at block 406 as occurring in the approximate time that the stepper motor 76 has completed its ramp-up, the microprocessor 344 at a block 408 reverses the direction of the ink ribbon supply motor 74 so as to create a desired amount of tension in the ink ribbon IR. This procedure eliminates smudging on start-up due to the inertia of a large ink ribbon supply roll SR. From block 408, the microprocessor 344 proceeds to block 410 to determine whether the back EMF of the take-up motor 75 is greater than zero and whether the end of ribbon, EOR, flag is off. If the back EMF is not greater than zero indicating that the ink ribbon is not moving, the microprocessor proceeds to block 411 to set an error flag. Similarly, if the EOR flag is not off, the microprocessor 344 process to block 411 to set the error flag. Once the ink ribbon IR is determined to be moving, the microprocessor 344 proceeds to block 412 to monitor the back EMF to find the true sector, i.e. the diameter range, of the ink ribbon on the take-up spool from an associated look-up table stored in the memory 346. Thereafter, at block 414, the microprocessor 344 utilizes the true sector, i.e. diameter range of the ink ribbon as well as the selected width to determine the constants necessary for controlling the motor torque to provide the desired tension. The microprocessor thereafter controls the motors 74 and 75 in accordance with the determined diameter range and ink ribbon width constants. At block 416, the microprocessor 344 determines whether an end of batch signal or the like has been received from the host 348. If not, the microprocessor 344 proceeds from block 416 to blocks 410 and 412 to continuously monitor and update the diameter sector of the ink ribbon spools and vary the control of the motors in accordance therewith. Once the microprocessor 344 determines at block 416 that ramp-down is to occur, the microprocessor 344 proceeds to block 418 to initiate and complete the ribbon ramp-down sequence. This sequence is such that the microprocessor 344 increases the current applied to the ink ribbon supply motor 74 so as to overcome the inertia on the ink ribbon supply spool SR. Simultaneously, the microprocessor 344 controls the take-up motor 75 to brake. Thereafter, the microprocessor 344 proceeds to block 420 indicating that the ribbon drive run sequence has been completed.

Figure 35:
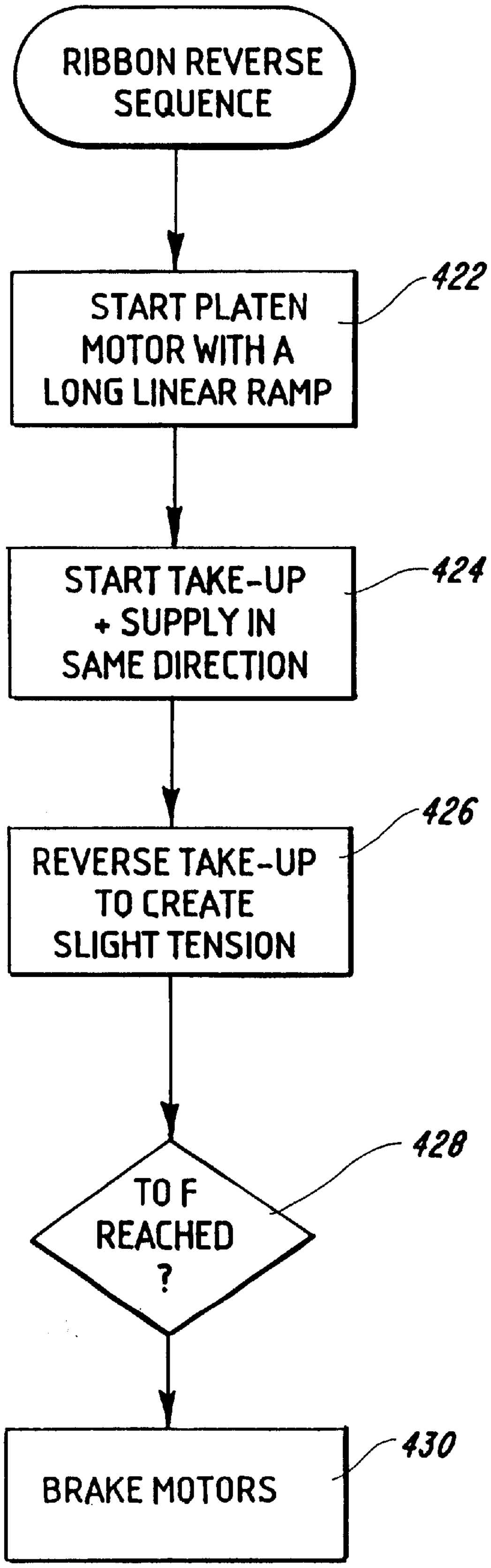
FIG. 35 is a flow chart illustrating a routine for driving the composite web and ink ribbon simultaneously in a reverse direction.

After printing and dispensing a batch of labels, the microprocessor 344 controls the platen motor 76 to be driven in a reverse direction to reverse the web C so that the next label L to be printed on is registered with the print head 69 at the top of form (TOF) position. In order to prevent smudging during the removal of the composite web direction, the microprocessor 344 implements the routine depicted in FIG. 35. In particular, at block 422 the microprocessor 344 starts the platen motor 76 in the reverse direction with a long linear ramp that is less than or approximately equal to one inch per second. The microprocessor 344 then starts the ink ribbon supply motor 74 at a block 424 in a wind-up direction so that the ink ribbon supply motor 74 is pulling the ink ribbon. If the microprocessor 344 determines that the take-up ribbon diameter is very large, in order to overcome the inertia of a large take-up ribbon spool, the microprocessor 344 may also start the take-up motor in the same direction as the ribbon supply motor so as to unwind the ink ribbon from the take-up spool. If this occurs, the microprocessor 344 at block 426 reverses the take-up motor after the inertia is overcome to create a slight tension in the ink ribbon IR as it is being moved in the reverse direction with the web C. Once the microprocessor 344 determines at block 428 that the top of form position has been reached, the microprocessor 344 controls the motors to brake so as to stop the web C at the top of form position and to stop the movement of the ink ribbon IR.

The operation of the ink ribbon drive motors 74 and 75 as well as the platen motor help to prevent smudging of the ink ribbon IR during various stages in the printing of labels. Many modifications and variations of the present invention are possible in light of the above teachings. Thus, it is to be understood that, within the scope of the appended claims, the invention may be practiced otherwise than as described hereinabove.

Figure 37:
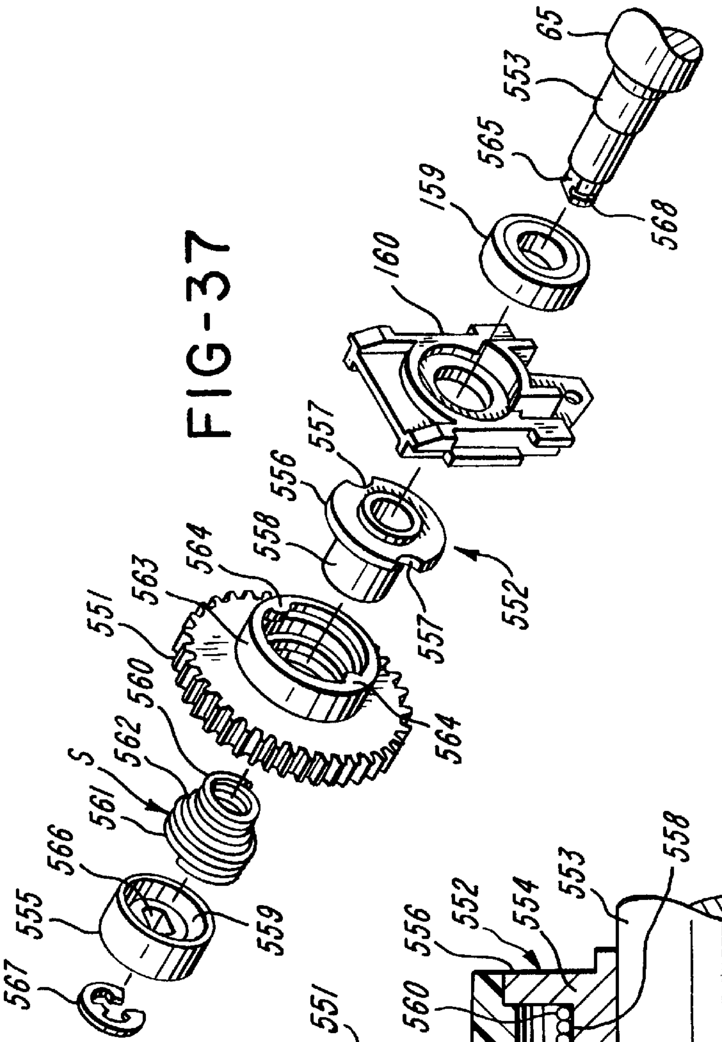
FIG. 37 is a fragmentary perspective view showing the slip clutch and a portion of the take-up roll.
Figure 38:
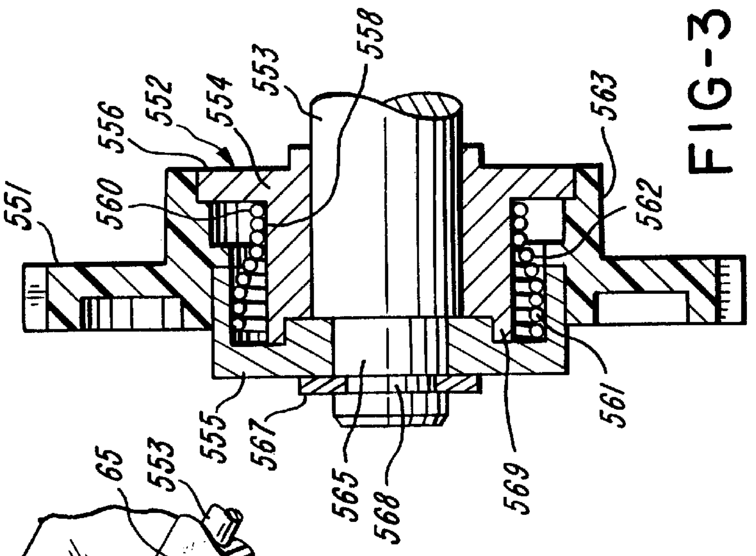
FIG. 38 is a sectional view of the slip clutch and a fragmentary portion of the take-up roll shaft.
Figure 36:
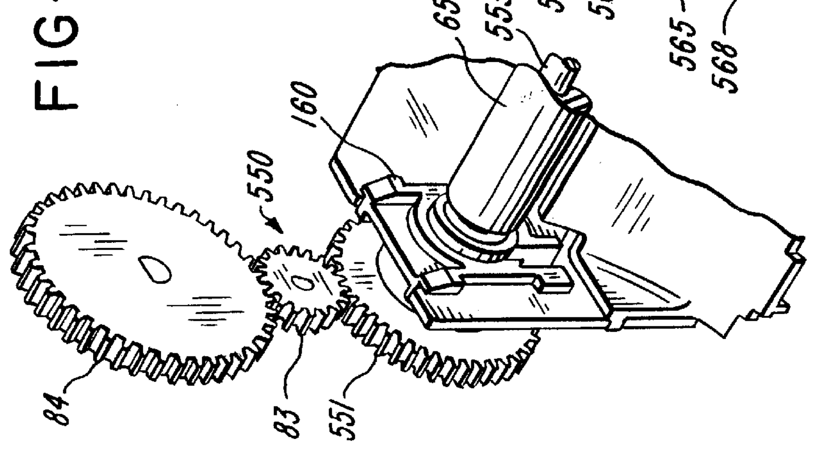
FIG. 36 is a fragmentary perspective view of a take-up mechanism and gearing for driving the take-up mechanism and the platen roll.

With reference to FIGS. 36 through 38, there is shown gearing generally indicated at 550 which includes the motor-driven gear or pinion 83 and the gear 84 meshing therewith which drives the platen roll 63. A gear 551 meshing with the gear 83 drives the take-up roll 65 through a slip clutch generally indicated at 552. The platen roll 65 is shown to have a stepped shaft 553 for mounting a sleeve 554 and a sleeve 555. The sleeves 554 and 555 in turn mount the gear 551. The sleeve 554 has an annular flange 556 with opposed notches 557. The sleeve 554 has an annular outer clutch surface 558 and the sleeve 555 has an annular inner clutch surface 559. A one-piece helical spring S wound to have a small diameter portion or turns 560, a large diameter portion or turns 561 and a transition portion 562. The small diameter portion 560 is wrapped around and in clutching contact with the outer clutch surface 558, and the large diameter portion 561 is inside and in clutching contact with the inner clutch surface 559.

The flange 556 is received in an annular portion 563 of the gear 551. The annular portion 563 has inwardly extending opposed projections 564 received in the notches 557. Thus, the sleeve 558 and the gear 551 are secured against rotation relative to each other. The shaft 553 has a non-circular portion 565 received in a matching non-circular hole 566 in the sleeve 555. Thus, the sleeve 555 is secured against relative rotation to the shaft 553. An E-ring 567 is received in an annular grove 568 in the shaft 553 and holds the sleeve 555 on the shaft 553. The sleeve 554 has an annular tubular portion 569 which contacts an annular outer surface 570 on the sleeve 555.

When the electric motor 76 drives the gear 83, the gear 84 rotates to drive the platen roll 63. The gear 83 also drives the gear 551. Rotation of the gear 551 causes the take-up roll 65 to be driven through the slip clutch 552. The gear ratio of the gearing 550 and the diameters of the platen roll 63 and take-up roll 65 are predetermined, so that if there is no slippage at the clutch 552, the peripheral speed of the take-up roll 65 will be greater than the peripheral speed of the platen roll 63. As the web W passes about the delaminator 64, the take-up roll 65 which drivingly contacts the web W applies tension to the web W downstream of the print head 69 and platen roll 63 and downstream of the delaminator 64. Because of the differential speed, there would be slippage between the take-up roll 65 and the web W. In order to avoid this condition, the slip clutch 552 limits the amount of torque applied to the take-up roll 65 so that the force applied to the take-up roll is limited. It is apparent that slippage in the clutch 552 can occur either between the small diameter portion 560 of the spring S and the surface 558 or between the large diameter portion 561 of the spring S and the surface 559, or both.

Other embodiments or modifications of the invention will suggest themselves to those skilled in the art, and all such of these as come within the spirit of this invention are included within its scope as best defined by the appended claims.

I claim:

1. Apparatus for printing and dispensing labels releasably adhered to a carrier web, comprising: a print head, a driven platen roll cooperable with the print head, a delaminator about which the carrier web is drawn to delaminate printed labels from the carrier web, the delaminator being disposed downstream of the print head and platen roll, a pair of cooperating rolls disposed downstream of the delaminator for drivingly contacting and advancing the carrier web, the pair of rolls being the sole means for advancing the carrier web beyond the delaminator, the pair of rolls having a nip between which the carrier web passes, the pair of rolls including a take-up roll driven to rotate at a peripheral speed greater than the peripheral speed of the platen roll, and a slip clutch for limiting the amount of driving force applied to the web by the take-up roll.

2. Apparatus for printing and dispensing labels releasably adhered to a carrier web, comprising: a print head, a platen roll cooperable with the print head, a delaminator about which the carrier web is drawn to delaminate printed labels from the web, the delaminator being disposed downstream of the print head and platen roll, a take-up roll disposed downstream of the delaminator for drivingly contacting the web, a first gear, an electric motor for driving the first gear, a second gear meshing with the first gear for driving the platen roll, a slip clutch, a third gear meshing with the first gear for driving the slip clutch, and the take-up roll being driven by the slip clutch.

3. Apparatus for printing and dispensing labels releasably adhered to a carrier web, comprising: a print head, a driven platen roll cooperable with the print head, a delaminator about which the carrier web is drawn to delaminate printed labels from the web, the delaminator being disposed downstream of the print head and the driven platen roll, a pair of cooperating rolls including a take-up roll disposed downstream of the delaminator for drivingly contacting the web, a slip clutch connected to the take-up roll, and wherein the slip clutch slips while drawing the web about the delaminator without-slippage between the take-up roll and the web.

4. Apparatus for printing and dispensing labels releasably adhered to a carrier web, comprising: a print head, a driven platen roll cooperable with the print head, a delaminator about which the carrier web is drawn to delaminate printed labels from the web, the delaminator being disposed downstream of the print head and platen roll, a pair of cooperating rolls including a take-up roll disposed downstream of the delaminator for drivingly contacting the web, a slip clutch, and means for driving the take-up roll through the slip clutch to maintain the web downstream of the platen roll under tension.

5. Apparatus as defined in claim 4, wherein the driving means includes an electric motor and gearing connecting the electric motor to the platen roll and to the take-up roll.

6. Apparatus for printing and dispensing labels releasably adhered to a carrier web, comprising: a print head, a driven platen roll cooperable with the print head, a delaminator about which the carrier web is drawn to delaminate printed labels from the carrier web, the delaminator being disposed downstream of the print head and platen roll, a pair of cooperating rolls disposed directly downstream of the delaminator for drivingly contacting and advancing the carrier web, the pair of rolls having a nip between which the carrier web passes, the pair of rolls including a take-up roll driven to rotate at a peripheral speed greater than the peripheral speed of the platen roll, and a slip clutch for limiting the amount of driving force applied to the web by the take-up roll.

* * * * *